United States Patent
Takahashi

(10) Patent No.: US 12,395,935 B2
(45) Date of Patent: Aug. 19, 2025

(54) VEHICLE AND COMMUNICATION CONTROL METHOD FOR THE SAME

(71) Applicant: TOYOTA JIDOSHA KABUSHIKI KAISHA, Toyota (JP)

(72) Inventor: Tomoya Takahashi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/146,095

(22) Filed: Dec. 23, 2022

(65) Prior Publication Data

US 2023/0300747 A1 Sep. 21, 2023

(30) Foreign Application Priority Data

Mar. 16, 2022 (JP) ................................. 2022-041478

(51) Int. Cl.
*H04W 52/02* (2009.01)
*B60L 53/66* (2019.01)
*B60L 58/12* (2019.01)

(52) U.S. Cl.
CPC ......... *H04W 52/0225* (2013.01); *B60L 53/66* (2019.02); *B60L 58/12* (2019.02); *B60L 2240/70* (2013.01)

(58) Field of Classification Search
CPC ..... H04W 52/0225; H04W 4/40; B60L 53/66; B60L 58/12; B60L 2240/70; B60L 53/14;

(Continued)

(56) References Cited

U.S. PATENT DOCUMENTS 8,598,743 B2 * 12/2013 Hall .......................... H03H 7/40
307/104
8,922,066 B2 * 12/2014 Kesler ..................... B60L 53/63
307/104

(Continued)

FOREIGN PATENT DOCUMENTS

CA      2944769 C  *  8/2020   ........ H02J 7/007194
CN   105210264 A  * 12/2015   .............. B60L 53/12

(Continued)

*Primary Examiner* — Mahendra R Patel
(74) *Attorney, Agent, or Firm* — Finnegan, Henderson, Farabow, Garrett and Dunner, LLP

(57) ABSTRACT

A vehicle includes: a first energy storage device that is electrically connectable to an external power supply; a wireless communication device; a second energy storage device that supplies power to the wireless communication device, and a control device that communicates with a management device outside the vehicle through the wireless communication device. The first energy storage device is configured to supply power to the second energy storage device. The control device is configured to restrict wireless communication by the wireless communication device when a communication restriction condition set using a cumulative number of communications of the wireless communication device is satisfied. The communication restriction condition when the external power supply and the vehicle are not electrically connected to each other is set to be more easily satisfied than the communication restriction condition when the external power supply and the vehicle are electrically connected to each other.

8 Claims, 11 Drawing Sheets

(58) Field of Classification Search
CPC .. B60L 53/68; B60L 1/00; B60L 50/60; H02J 3/322; H02J 7/00032; H02J 13/00032; H02J 2310/48; H02J 7/342; H02J 7/00306; H02J 7/0047; H02J 7/0068; Y02T 10/70; Y02T 10/7072; Y02T 90/16
USPC .......................................................... 455/575
See application file for complete search history.

(56) References Cited

U.S. PATENT DOCUMENTS

| | | | | |
|---|---|---|---|---|
| 9,246,336 | B2* | 1/2016 | Kurs | H03H 7/40 |
| 9,696,782 | B2* | 7/2017 | Chandra | G06F 1/3287 |
| 9,744,858 | B2* | 8/2017 | Hall | H02J 50/12 |
| 9,748,765 | B2* | 8/2017 | Huang | H02J 7/00047 |
| 9,939,862 | B2* | 4/2018 | Badam | G06F 1/3203 |
| 10,018,744 | B2* | 7/2018 | Roy | H02J 50/70 |
| 10,061,366 | B2* | 8/2018 | Badam | G06F 1/263 |
| 11,722,177 | B2* | 8/2023 | Leabman | H02J 50/402 |
| | | | | 320/108 |
| 2009/0228157 | A1* | 9/2009 | Breed | B60W 30/16 |
| | | | | 701/1 |
| 2010/0262566 | A1* | 10/2010 | Yamamoto | B60L 53/665 |
| | | | | 705/412 |
| 2015/0145483 | A1* | 5/2015 | Shinohara | H02J 7/0070 |
| | | | | 320/134 |
| 2015/0165918 | A1* | 6/2015 | Shizuno | B60L 53/68 |
| | | | | 320/109 |
| 2018/0261893 | A1* | 9/2018 | Fujita | H02J 7/005 |
| 2020/0298720 | A1* | 9/2020 | Ogawa | H02J 3/144 |
| 2021/0075226 | A1* | 3/2021 | Kogo | H02J 3/32 |

FOREIGN PATENT DOCUMENTS

| | | | | | |
|---|---|---|---|---|---|
| CN | 107872083 A | * | 4/2018 | | H01M 10/44 |
| JP | 2022115360 A | * | 8/2020 | | B60L 53/63 |
| JP | 2020-156149 A | | 9/2020 | | |
| JP | 2022139814 A | * | 9/2022 | | B60L 53/20 |
| WO | WO-9926330 A2 | * | 5/1999 | | B60L 11/185 |
| WO | WO-2010032309 A1 | * | 3/2010 | | B60L 50/16 |
| WO | WO-2013080272 A1 | * | 6/2013 | | B60L 11/123 |
| WO | WO-2014181669 A1 | * | 11/2014 | | B60L 53/126 |
| WO | WO-2015125430 A1 | * | 8/2015 | | B60L 11/007 |
| WO | WO-2019087010 A1 | * | 5/2019 | | H02J 50/10 |

* cited by examiner

VEHICLE AND COMMUNICATION CONTROL METHOD FOR THE SAME

CROSS-REFERENCE TO RELATED APPLICATION

This application claims priority to Japanese Patent Application No. 2022-041478 filed on Mar. 16, 2022, incorporated herein by reference in its entirety.

BACKGROUND

1. Technical Field

The present disclosure relates to vehicles and communication control methods for the same.

2. Description of Related Art

In recent years, electric utilities have been known that bundle a plurality of distributed energy resources (hereinafter also referred to as "DERs") and provide an energy management service (hereinafter referred to as "aggregators"). For example, Japanese Unexamined Patent Application Publication No. 2020-156149 (JP 2020-156149 A) discloses a technique for an aggregator to operate power devices according to an operation plan. The charge and discharge performance of the power devices can vary depending on the environment (e.g., temperature). Therefore, in JP 2020-156149, the aggregator acquires the charge and discharge performance of the power devices corrected by environmental information.

SUMMARY

In recent years, a technique for a server outside a vehicle to remotely control the vehicle has been attracted attention. Such a remote control technique can be used for power balancing (energy management) of an external power supply. For example, a server remotely controls a vehicle equipped with a wireless communication device and an energy storage device by wireless communication to perform charge and discharge control of the energy storage device for power balancing of the external power supply. However, when the wireless communication device is used frequently, an auxiliary battery that supplies power to the wireless communication device may run short of power.

The present disclosure provides a vehicle and a communication control method for the vehicle that facilitates power balancing of an external power source through wireless communication and that makes it less likely that an energy storage device that supplies power to a wireless communication device will run short of power.

A vehicle according to a first aspect of the present disclosure includes: a first energy storage device configured to be electrically connected to an external power supply; a wireless communication device; a second energy storage device configured to supply power to the wireless communication device; and a control device configured to communicate with a management device outside the vehicle through the wireless communication device. The first energy storage device is configured to supply power to the second energy storage device. The control device is configured to restrict wireless communication of the wireless communication device when a communication restriction condition set using a cumulative number of communications of the wireless communication device is satisfied. The communication restriction condition when the external power supply and the vehicle are not electrically connected to each other is set to be more easily satisfied than the communication restriction condition when the external power supply and the vehicle are electrically connected to each other.

According to the above configuration, wireless communication of the wireless communication device is restricted when the communication restriction condition is satisfied. This reduces power consumption of the second energy storage device (e.g., an auxiliary battery), so that the second energy storage device is less likely to run short of power. The higher the cumulative number of communications by the wireless communication device, the greater the power consumption of the second energy storage device tends to be. Therefore, the use of the cumulative number of communications of the wireless communication device facilitates appropriate setting of the communication restriction condition. In the above configuration, the communication restriction condition is less easily satisfied when the external power supply and the vehicle are electrically connected to each other than when the external power supply and the vehicle are not electrically connected to each other. This makes it easier for the management device to remotely control the vehicle by wireless communication to perform vehicle control for power balancing of the external power supply (i.e., charge control or discharge control of the first energy storage device). When the external power supply and the vehicle are electrically connected to each other, the second energy storage device can receive power supplied form the external power supply via the first energy storage device.

The cumulative number of communications of the wireless communication device may be updated by the control device. The control device may increment the cumulative number of communications every time the wireless communication device performs wireless communication, and may reset the cumulative number of communications to an initial value (e.g., zero) when a predetermined reset condition is satisfied.

The external power supply may be a power grid that supplies power to a predetermined area (e.g., a microgrid or a large-scale electrical network developed as an infrastructure). The external power supply may be a smart grid. The external power supply may supply alternating current (AC) power or direct current (DC) power. Power balancing may be frequency control or may be supply-demand balancing.

The management device may be one computer, or may be composed of a plurality of computers that can communicate with each other. The vehicle may be an electrified vehicle (xEV) that runs on power stored in the first energy storage device. Electrified vehicles (xEVs) include battery electric vehicles (BEVs), plug-in hybrid electric vehicles (PHEVs), and fuel cell electric vehicles (FCEVs).

The communication restriction condition may not be satisfied when a state of charge (SOC) of the second energy storage device is equal to or greater than a first threshold. In such a configuration, wireless communication of the wireless communication device is not restricted when the SOC of the second energy storage device is sufficiently high. This facilitates power balancing of the external power supply through wireless communication. The SOC indicates the remaining capacity of the energy storage device. For example, the SOC is the ratio of the available capacity to the capacity in the fully charged state and varies between 0% and 100%.

The control device may be configured to prohibit wireless communication of the wireless communication device when the communication restriction condition is satisfied by the cumulative number of communications of the wireless communication device reaching a first upper limit value with the external power supply and the vehicle not being electrically connected to each other. The control device may be configured to prohibit wireless communication of the wireless communication device when the communication restriction condition is satisfied by the cumulative number of communications of the wireless communication device reaching a second upper limit value that is greater than the first upper limit value with the external power supply and the vehicle being electrically connected to each other.

In the above configuration, the first upper limit is smaller than the second upper limit. Accordingly, the communication restriction condition when the external power supply and the vehicle are not electrically connected to each other is more easily satisfied than the communication restriction condition when the external power supply and the vehicle are electrically connected to each other. Moreover, since wireless communication of the wireless communication device is prohibited when the cumulative number of communications by the wireless communication device reaches the upper limit value (first or second upper limit value), the second energy storage device is less likely to run short of power.

The second energy storage device may be configured to be charged while the vehicle is traveling. The control device may be is configured to reset the cumulative number of communications of the wireless communication device when a continuous travel distance or travel time of the vehicle becomes equal to or greater than a second threshold value.

When the vehicle travels continuously for a long period of time, the SOC of the second energy storage device is estimated to be sufficiently increased by the power supplied from the first energy storage device. In the above configuration, when the continuous travel distance or travel time of the vehicle becomes greater than a predetermined value (second threshold), the cumulative number of communications of the wireless communication device is reset, and the wireless communication device becomes available. Wireless communication of the wireless communication device that has been prohibited is resumed. This facilitates power balancing of the external power supply through wireless communication.

The first energy storage device may be configured to supply power to the second energy storage device while the first energy storage device is being charged with power supplied from the external power supply. The control device may be configured to reset the cumulative number of communications of the wireless communication device when an amount of charge power or charge duration due to a continuous charge of the first energy storage device becomes equal to or greater than a third threshold.

When the first energy storage device continues to be charged for a long period of time, the SOC of the second energy storage device is estimated to be sufficiently increased by the power supplied from the first energy storage device. In the above configuration, when the amount of charge power or charge duration due to a continuous charge of the first energy storage device becomes equal to or greater than a predetermined value (third threshold), the cumulative number of communications of the wireless communication device is reset, and the wireless communication device becomes available. Wireless communication of the wireless communication device that has been prohibited is resumed. This facilitates power balancing of the external power supply through wireless communication.

The wireless communication device may be configured to transmit a state of the vehicle to the management device as needed. The control device may be configured to start a charge of the first energy storage device using power supplied from the external power supply when the cumulative number of communications of the wireless communication device reaches a predetermined value that is smaller than the first upper limit with no charge of the first energy storage device being performed with the vehicle being electrically connected to the external power supply.

Depending on the charge condition for the first energy storage device set in the vehicle by the user, the first energy storage device may not be charged even when the vehicle is electrically connected to the external power supply, and the vehicle may be left for a long period of time without the first energy storage device being charged. When the wireless communication of such a vehicle is used frequently, the second energy storage device that supplies power to the wireless communication device tends to run short of power. In this regard, according to the above configuration, a charge of the first energy storage device is started when the cumulative number of communications of the wireless communication device becomes equal to or greater than the predetermined value that is smaller than the first upper limit. The first energy storage device can therefore supply power to the second energy storage device, and the second energy storage device is less likely to run short of power. Since the management device receives the state of the vehicle as needed, the management device can more easily appropriately control the vehicle for power balancing of the external power supply.

The control device may be configured to charge the first energy storage device according to a charge command received from the management device with the external power supply and the first energy storage device being electrically connected together.

According to the above configuration, power balancing of the external power supply is performed by charging the first energy storage device. Since the first energy storage device is charged, power can be supplied from the first energy storage device to the second energy storage device, and the second energy storage device is therefore less likely to run short of power during power balancing of the external power supply.

The control device may be configured to distinguish between first power supply equipment with a function to communicate with the management device and second power supply equipment without a function to communicate with the management device. The control device may be configured to communicate with the management device through the first power supply equipment when the control device charges the first energy storage device according to the charge command using power supplied from the external power supply to the vehicle via the first power supply equipment. The control device may be configured to communicate with the management device through the wireless communication device when the control device charges the first energy storage device according to the charge command using power supplied from the external power supply to the vehicle via the second power supply equipment.

When the control device performs power balancing of the external power supply (i.e., a charge according to the charge command from the management device) using the first power supply equipment with a function to communicate with the management device, the control device communicates with the management device through the first power supply equipment rather than through the wireless communication device. This reduces power consumption of the second energy storage device, so that the second energy storage device is less likely to run short of power. On the other hand, when the control device performs power balancing of the external power supply using the second power supply equipment, the control device communicates with the management device through the wireless communication device (in-vehicle communication device). Power balancing of the external power supply can thus be performed using the power supply equipment without a function to communicate with the management device (second power supply equipment).

A communication control method for a vehicle according to a second aspect of the present disclosure is a method for controlling communication of a vehicle described below. The method includes a transmission step, a first prohibition step, and a second prohibition step.

The vehicle includes: a first energy storage device that is electrically connectable to an external power supply; a wireless communication device; a second energy storage device that supplies power to the wireless communication device; and a control device that communicates with a management device outside the vehicle via the wireless communication device.

In the transmission step, the control device receives a control command for power balancing of the external power supply from the management device via the wireless communication device. In the first prohibition step, the control device prohibits wireless communication of the wireless communication device when a cumulative number of communications of the wireless communication device reaches a first upper limit value with the external power supply and the vehicle not being electrically connected to each other. In the second prohibition step, the control device prohibits wireless communication of the wireless communication device when the cumulative number of communications of the wireless communication device reaches a second upper limit value that is greater than the first upper limit value with the external power supply and the vehicle being electrically connected to each other.

Like the vehicle described above, this communication control method also facilitates power balancing of the external power supply using the first energy storage device, and makes it less likely that the second energy storage device that supplies power to the wireless communication device will run short of power.

The present disclosure provides a vehicle and a communication control method for the vehicle that facilitates power balancing of an external power source through wireless communication and that makes it less likely that an energy storage device that supplies power to a wireless communication device will run short of power.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
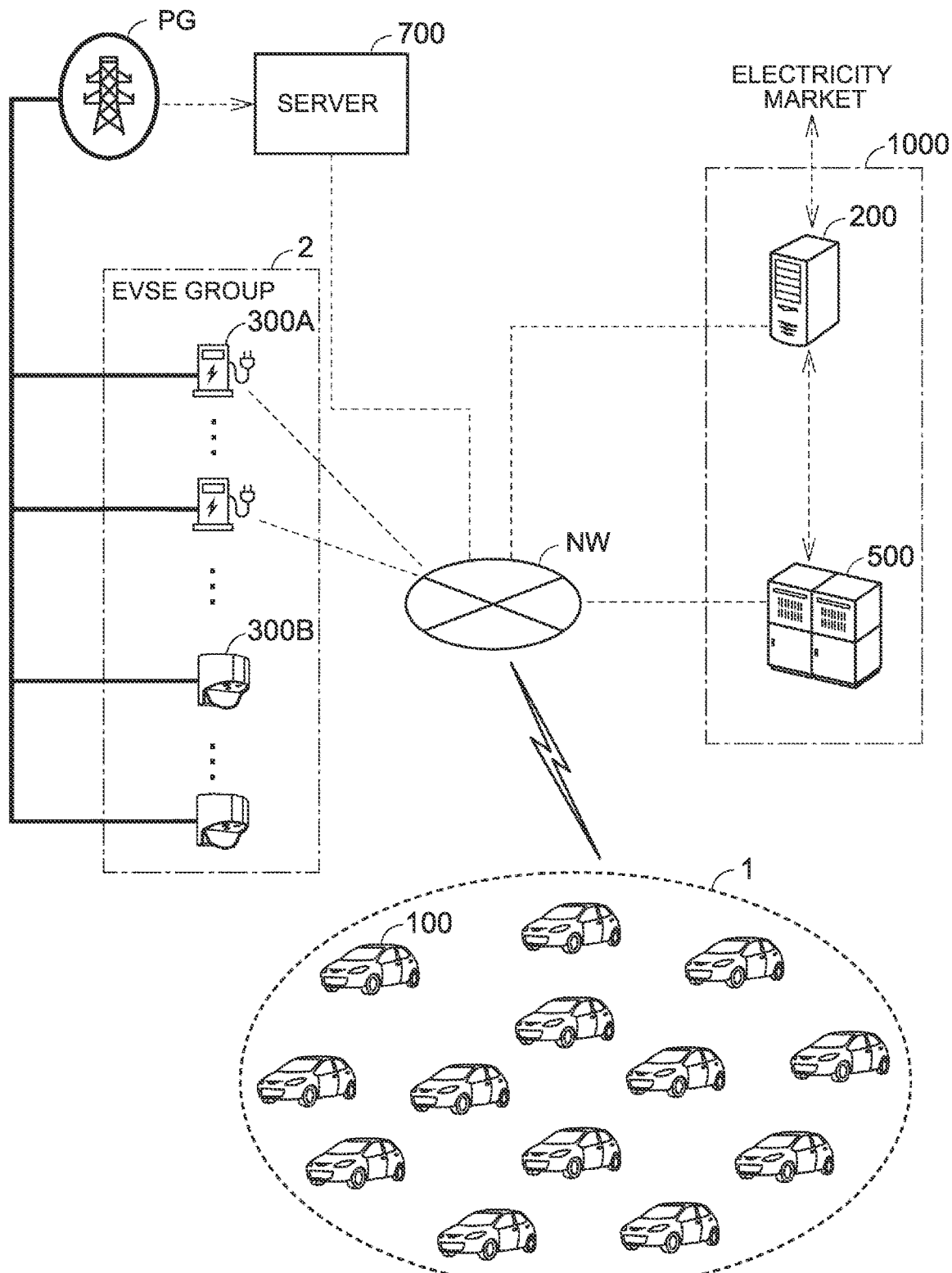
FIG. 1 shows a schematic configuration of a management system according to an embodiment of the present disclosure.

FIG. 1 shows a schematic configuration of a management system according to an embodiment of the present disclosure. Referring to FIG. 1, the management system according to the present embodiment includes a vehicle group 1, an EVSE group 2, a server 700, and a management device 1000. The management device 1000 includes servers 200, 500. EVSE stands for electric vehicle supply equipment.

Each of the servers 200, 500, and 700 is, for example, a computer equipped with a Human Machine Interface (HMI) and a communication interface (I/F). Each computer includes a processor and a storage device. The storage device stores, in addition to programs to be executed by the processor, information to be used in the programs (e.g., maps, mathematical formulas, and various parameters). The HMI includes an input device and a display device. The HMI may be a touch panel display.

A power grid PG is an electrical network that supplies electric power to a predetermined area. The power grid PG is formed by power transmission and distribution equipment. A plurality of power plants is connected to the power grid PG. Electric power is supplied from the power plants to the power grid PG. In the present embodiment, an electric power company maintains and manages the power grid PG (commercial power supply). The electric power company is a transmission system operator (TSO) (grid operator). The power grid PG supplies alternating current (AC) power (e.g., three-phase AC power). The server 700 is a computer belonging to the TSO. The server 700 may include a central load dispatching center system and a simple command system. The power grid PG according to the present embodiment is an example of the "external power supply" according to the present disclosure.

The server 500 periodically communicates with each vehicle in the vehicle group 1. Each vehicle in the vehicle group 1 is an electrified vehicle (xEV), and is operable as a balancing power for the power grid PG. Each vehicle in the vehicle group 1 is, for example, a privately owned vehicle (POV). The number of vehicles in the vehicle group 1 may be 5 or more and less than 100, or may be 100 or more. It is assumed in the present embodiment that the vehicle group 1 includes 30 or more and less than 100 vehicles. The vehicle group 1 includes a vehicle 100 having the configuration that will be described below (see FIG. 2). The vehicle 100 may have the same configuration as or a different configuration from the other vehicles in the vehicle group 1.

The EVSE group 2 includes a plurality of EVSE units that is supplied with electric power from the power grid PG. The EVSE group 2 includes EVSE units 300A, 300B having the configuration that will be described later (see FIG. 3). The EVSE unit 300A is first power supply equipment having a function to communicate with the server 200 (hereinafter also referred to as "first EVSE unit"). The EVSE unit 300B is second power supply equipment that does not have a function to communicate with the server 200 (hereinafter also referred to as "second EVSE unit"). The EVSE group 2 may include any number and types of EVSE units.

The management device 1000, the vehicle group 1, and the first EVSE unit included in the EVSE group 2 are configured to communicate with each other via a communication network NW. The server 700 communicates with the server 200 via the communication network NW. In the management device 1000, the servers 200, 500 are configured to communicate with each other. The communication network NW is a wide area network formed by, for example, the Internet and wireless base stations. Each vehicle in the vehicle group 1 is configured to access the communication network NW by wireless communication. The first EVSE unit is connected to the communication network NW via, for example, a communication line. The second EVSE unit is not connected to the communication network NW. The form of communication is not limited to the above and can be changed as appropriate. For example, the first EVSE unit may be connected to the communication network NW by wireless communication.

Figure 2:
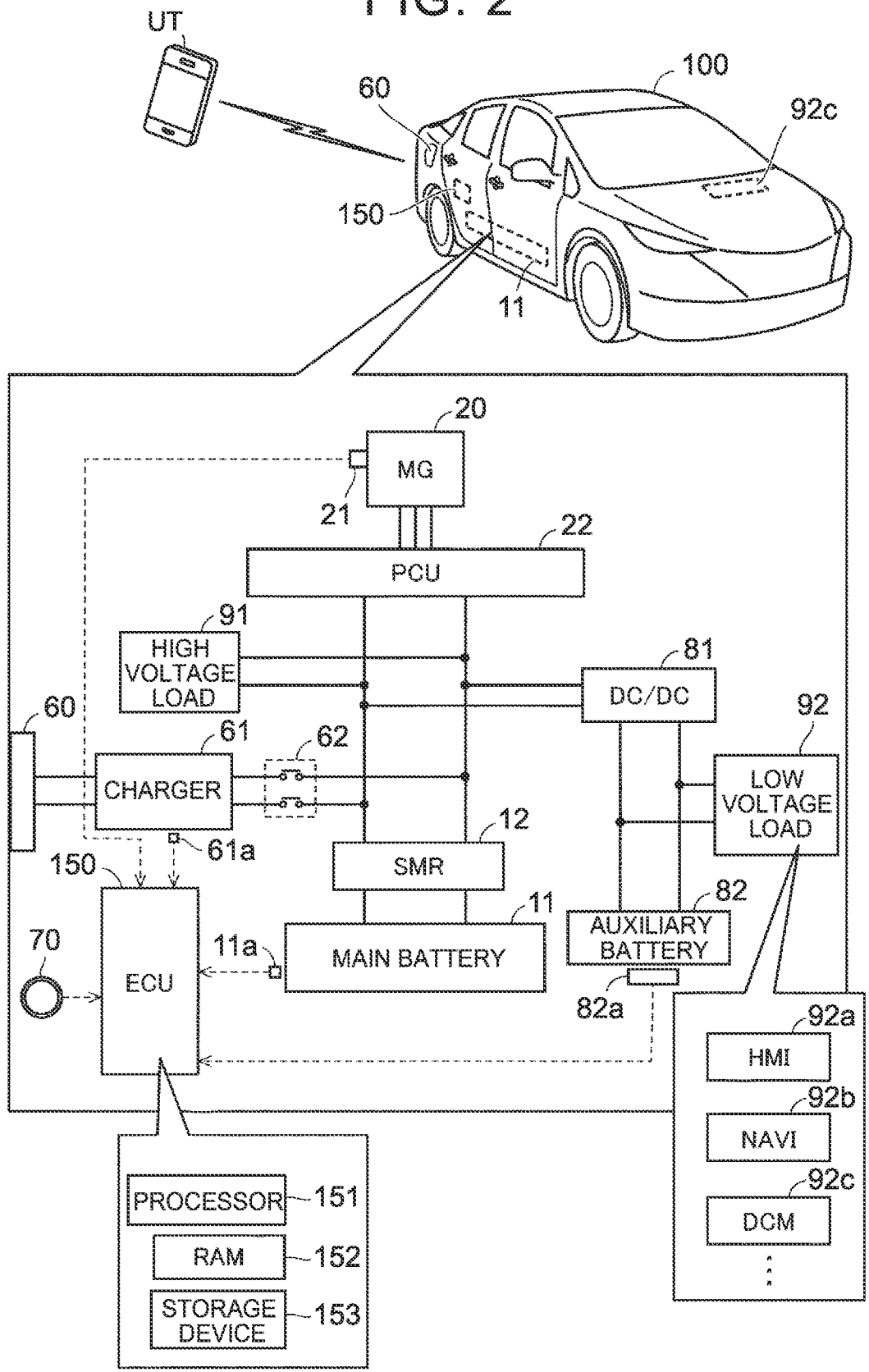
FIG. 2 shows a configuration of a vehicle shown in FIG. 1.

FIG. 2 shows the configuration of the vehicle 100. Referring to FIG. 2 together with FIG. 1, the vehicle 100 includes a main battery 11, a system main relay (SMR) 12, a motor generator (MG) 20, a power control unit (PCU) 22, an inlet 60, and an electronic control unit (ECU) 150.

The ECU 150 includes a processor 151, a random access memory (RAM) 152, and a storage device 153. The ECU 150 may be a computer. The processor 151 may be a central processing unit (CPU). The RAM 152 temporarily stores data to be processed by the processor 151. The storage device 153 is configured to save stored information. The storage device 153 stores, in addition to programs, information to be used in the programs (e.g., maps and various parameters). In the present embodiment, various controls in the ECU 150 (e.g., charge control for the main battery 11) are performed as the processor 151 executes the program stored in the storage device 153. The ECU 150 is an example of the "control device" according to the present disclosure.

The main battery 11 stores electric power for moving the vehicle 100. The vehicle 100 is configured to run on the electric power stored in the main battery 11. The vehicle 100 according to the present embodiment is a battery electric vehicle (BEV) without an engine (internal combustion engine). The main battery 11 may be a known energy storage device for vehicles (e.g., a liquid secondary battery, an all-solid-state secondary battery, or an assembled battery). Examples of a secondary battery for vehicles include a lithium-ion battery and a nickel metal hydride battery.

The vehicle 100 further includes a monitoring module 11a that monitors the state of the main battery 11. The monitoring module 11a includes various sensors that detect the state of the main battery 11 (e.g., voltage, current, and temperature). The monitoring module 11a outputs the detection results to the ECU 150. The monitoring module 11a may be a battery management system (BMS) having a state of charge (SOC) estimation function, a state of health (SOH) estimation function, a cell voltage equalization function, a diagnostic function, and a communication function, in addition to the above sensor function. The ECU 150 can acquire the state of the main battery 11 (e.g., temperature, current, voltage, SOC, and internal resistance) based on the output of the monitoring module 11a.

The vehicle 100 further includes a charger 61 (in-vehicle charger) and a charging relay 62. The charger 61 and the charging relay 62 are located between the inlet 60 and the main battery 11. The charger 61 and the charging relay 62 are controlled by the ECU 150. In the present embodiment, a charging line including the inlet 60, the charger 61, and the charging relay 62 is connected between the SMR 12 and the PCU 22. However, the present disclosure is not limited to this, and the charging line may be connected between the main battery 11 and the SMR 12.

The charger 61 charges the main battery 11 with power (e.g., AC power) input from outside the vehicle 100 to the inlet 60. The charger 61 includes a power converter circuit. The power converter circuit may be configured to convert alternating current (AC) to direct current (DC). The power converter circuit may include at least one of the following: a power factor correction (PFC) circuit, an inverter, an isolation circuit (e.g., isolation transformer), and a rectifier circuit. The charging relay 62 connects and disconnects the electrical path from the inlet 60 to the main battery 11. The vehicle 100 further includes a monitoring module 61a that monitors the state of the charger 61 (e.g., charging power). The monitoring module 61a includes various sensors that detect the state of the charger 61 (e.g., current sensor and voltage sensor), and outputs the detection results to the ECU 150.

The MG 20 is, for example, a three-phase AC motor generator. The MG 20 functions as a traction motor of the vehicle 100. The MG 20 is driven by the PCU 22 and rotates drive wheels of the vehicle 100. The PCU 22 drives the MG 20 using power supplied from the main battery 11. The SMR 12 connects and disconnects the electrical path from the main battery 11 to the PCU 22. The SMR 12 and the PCU 22 are controlled by the ECU 150. The PCU 22 includes, for example, an inverter and a converter, and performs power conversion as instructed by the ECU 150. The SMR 12 is closed (connected) when the vehicle 100 is traveling. The SMR 12 is also closed when power is transferred between the main battery 11 and the inlet 60 (and outside the vehicle).

The MG 20 generates regenerative power and supplies the generated regenerative power to the main battery 11. When the vehicle 100 is traveling, the main battery 11 is regeneratively charged with the power generated by the MG 20. The vehicle 100 further includes a motor sensor 21 that monitors the state of the MG 20. The motor sensor 21 includes various sensors that detect the state of the MG 20 (e.g., current sensor, voltage sensor, and temperature sensor), and output the detection results to the ECU 150. The vehicle 100 may include any desired number of traction motors. The vehicle 100 may include one traction motor, two traction motors, or three or more traction motors. The traction motor may be an in-wheel motor.

The vehicle 100 further includes a direct current-to-direct current (DC-to-DC) converter 81, an auxiliary battery 82, a monitoring module 82*a*, a high voltage load 91, and a low voltage load 92. The high voltage load 91 is high voltage auxiliaries. The low voltage load 92 is low voltage auxiliaries. The driving voltage for the low voltage load 92 is lower than that for the high voltage load 91. The DC-to-DC converter 81 steps down the voltage of the power supplied from the main battery 11 and outputs the resultant voltage to the auxiliary battery 82 and the low voltage load 92. The auxiliary battery 82 is a low voltage in-vehicle battery, and supplies power to the low voltage load 92. The capacity of the auxiliary battery 82 is smaller than that of the main battery 11. The auxiliary battery 82 may be a lead-acid battery. The SMR 12 is closed when the main battery 11 supplies power to at least one of the following: the high voltage load 91, the low voltage load 92, and the auxiliary battery 82. The main battery 11 and the auxiliary battery 82 are an example of the "first energy storage device" and the "second energy storage device" according to the present disclosure, respectively.

The monitoring module 82*a* includes various sensors that detect the state of the auxiliary battery 82 (e.g., voltage, current, and temperature), and outputs the detection results to the ECU 150. The ECU 150 can acquire the state of the auxiliary battery 82 (e.g., temperature, current, voltage, SOC, and internal resistance) based on the output of the monitoring module 82*a*. The auxiliary battery 82 is configured to be charged while the vehicle 100 is traveling. The monitoring module 82*a* constantly monitors the voltage across the terminals of the auxiliary battery 82 or the SOC of the auxiliary battery 82 while the vehicle 100 is traveling. The ECU 150 charges the auxiliary battery 82 so that the voltage across the terminals of the auxiliary battery 82 or the SOC of the auxiliary battery 82 becomes equal to or higher than a predetermined value. For example, the auxiliary battery 82 is charged with the power stored in the main battery 11 or the power generated by the MG 20.

Each of the high voltage load 91 and the low voltage load 92 receives an operation from a user. Each of the high voltage load 91 and the low voltage load 92 includes a power supply circuit that generates driving power according to the user's operation. When the user operates the high voltage load 91, the ECU 150 controls the SMR 12 and the high voltage load 91 according to the user's operation. When the user operates the low voltage load 92, the ECU 150 controls the SMR 12, the DC-to-DC converter 81, and the low voltage load 92 according to the user's operation. In the present embodiment, the high voltage load 91 includes air conditioning equipment. The air conditioning equipment may include a built-in inverter. The low voltage load 92 includes a Human-Machine Interface (HMI) 92*a*, a navigation system (hereinafter also referred to as "NAVI") 92*b*, and a Data Communication Module (DCM) 92*c*. The low voltage load 92 may further include a lighting device.

The HMI 92*a* includes an input device and a display device. The HMI 92*a* may include a touch panel display. The HMI 92*a* may take reservations for a timer charge that will be described later. The HMI 92*a* may include a meter panel and/or a head-up display. The HMI 92*a* may include a smart speaker that receives voice input.

The NAVI 92*b* includes a touch panel display, a Global Positioning System (GPS) module, and a storage device (none of which are shown). The storage device stores map information. The touch panel display receives input from the user and displays a map and other information. The GPS module is configured to receive signals from GPS satellites, not shown (hereinafter referred to as "GPS signals"). The NAVI 92*b* detects the location of the vehicle 100 using the GPS signals. The NAVI 92*b* is configured to display the location of the vehicle 100 in real time on the map. The NAVI 92*b* performs a route search for finding an optimal route (e.g., shortest route) from the current location of the vehicle 100 to the destination by referring to the map information. The NAVI 92*b* may update that map information by Over The Air (OTA) as needed.

The DCM 92*c* is a wireless communication device that can access the communication network NW. The DCM 92*c* is configured to communicate with the management device 1000 by wireless communication. The ECU 150 communicates with devices located outside the vehicle (e.g., management device 1000) via the DCM 92*c*. In the present embodiment, the vehicle 100 receives commands or notifications from the servers 200, 500 by the DCM 92*c*. The DCM 92*c* may include a communication I/F compatible with the fifth or sixth generation mobile communication system (5G or 6G).

The vehicle 100 is electrically connected to the power grid PG via the EVSE unit when the EVSE unit is electrically connected to the vehicle 100 in a parked state via a charging cable (hereinafter also referred to as "plugged-in state"). The vehicle 100 is not electrically connected to the EVSE unit and the power grid PG while, for example, the vehicle 100 is traveling (hereinafter also referred to as "plugged-out state"). The inlet 60 of the vehicle 100 is connectable to both of the EVSE units 300A, 300B that will be described below.

Figure 3:
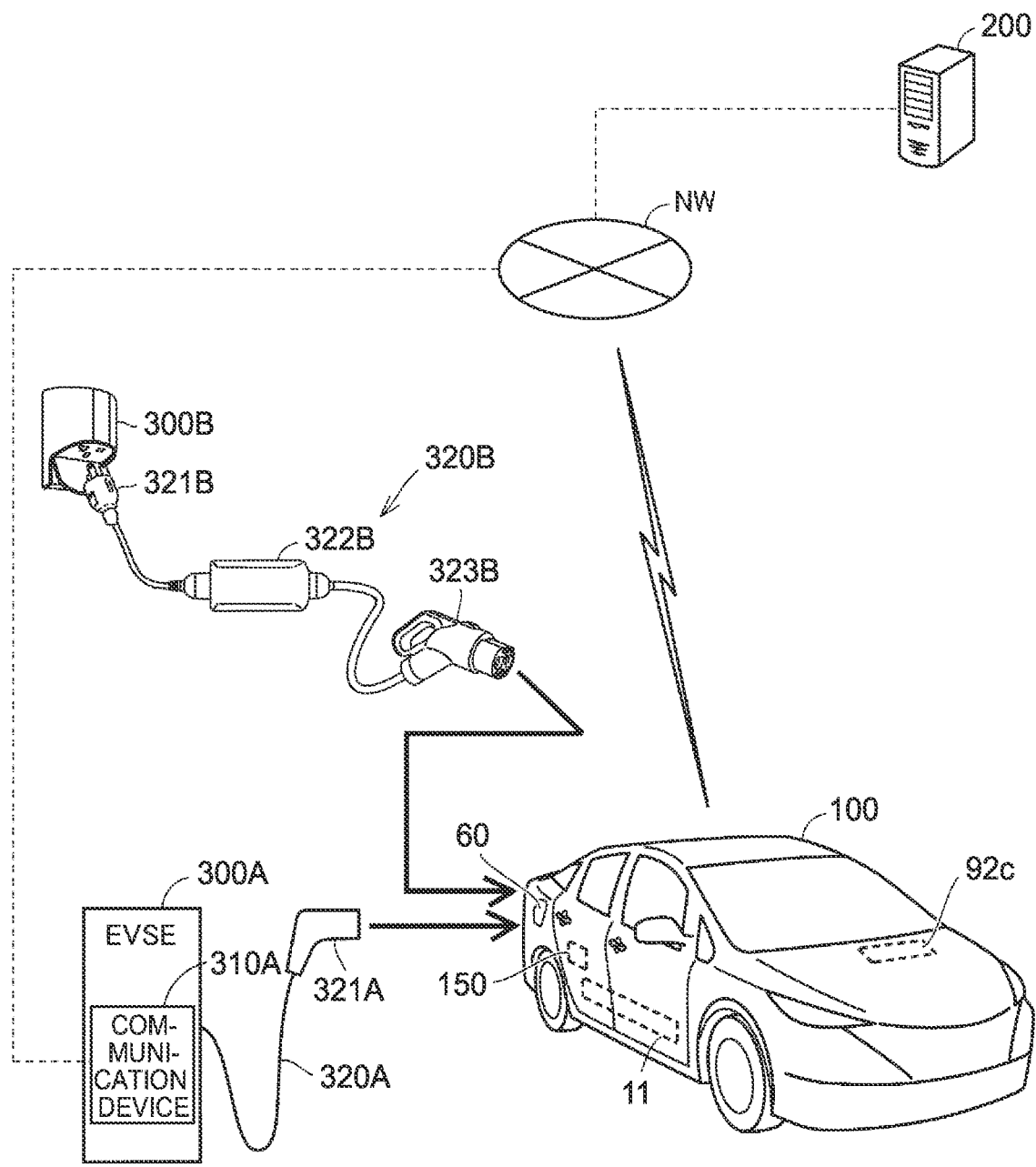
FIG. 3 illustrates a configuration of an EVSE unit shown in FIG. 1.

FIG. 3 illustrates the configuration of the EVSE units 300A, 300B. Referring to FIG. 3 together with FIGS. 1 and 2, the EVSE units 300A, 300B are equipped with charging cables 320A, 320B, respectively. The EVSE units 300A, 300B can be electrically connected to the vehicle 100 via the charging cables 320A, 320B, respectively. The EVSE units 300A, 300B are configured to convert the power (e.g., AC power) supplied from the power grid PG (FIG. 1) to power suitable for supply to the vehicle 100 and supply the resultant power to the vehicle 100.

In the present embodiment, the EVSE unit 300A is installed in the workplace of the user of the vehicle 100. The EVSE unit 300A includes a communication device 310A. The communication device 310A includes a communication I/F for communication with the server 200. The charging cable 320A is connected to the body of the EVSE unit 300A. The charging cable 320A includes a connector 321A (plug) at its distal end, and includes a communication line and a power line inside. The EVSE unit 300A further includes a first control device and a first power converter circuit (both not shown) as its built-in components. The first control device communicates with the vehicle 100 and the server 200. The first control device communicates with the server 200 through the communication device 310A. The first control device communicates with the vehicle 100 via the communication line inside the charging cable 320A.

The connector 321A can be connected to and disconnected from the inlet 60 of the vehicle 100. The vehicle 100 is electrically connected to the power grid PG via the EVSE unit 300A when the connector 321A is connected to the inlet 60 of the vehicle 100 (hereinafter also referred to as "first plugged-in state"). In the first plugged-in state, the first control device controls the first power converter circuit based on a command from the vehicle 100 or the server 200 and outputs supply power (e.g., AC power) to the connector 321A.

In the present embodiment, the EVSE unit 300B is installed in the home of the user of the vehicle 100. The power grid PG (FIG. 1) may supply 100V or 200V power to the EVSE unit 300B via a residential distribution board, not shown (i.e., a distribution board connected to house wires). The charging cable 320B is connected to the EVSE unit 300B. The charging cable 320B includes a plug 321B, a control box 322B, and a connector 323B, and includes a communication line and a power line inside. The EVSE unit 300B includes an outlet to and from which the plug 321B can be connected and disconnected. The plug 321B is connected to the outlet of the EVSE unit 300B and receives AC power from this outlet. The AC power output from the EVSE unit 300B to the plug 321B (input end) is output to the connector 323B (output end) through the control box 322B.

The control box 322B includes a second control device and a second power converter circuit (both not shown) as its built-in components. The second control device communicates with the vehicle 100 via the communication line inside the charging cable 320B. The second control device does not communicate with the server 200. The AC power adjusted to an appropriate voltage and current by the second power converter circuit in the control box 322B is output from the connector 323B. The connector 323B can be connected to and disconnected from the inlet 60 of the vehicle 100. The vehicle 100 is electrically connected to the power grid PG via the EVSE unit 300B when the plug 321B is connected to the outlet of the EVSE unit 300B and the connector 323B is connected to the inlet 60 of the vehicle 100 (hereinafter also referred to as "second plugged-in state"). In the second plugged-in state, the second control device controls the second power converter circuit based on a command from the vehicle 100 and outputs supply power (e.g., AC power) to the connector 323B.

The configuration of each EVSE unit 300A, 300B is not limited to the configuration described above. For example, either or both of the EVSE units 300A, 300B may output DC power. The inlet 60 may have separate connection units for the EVSE units 300A, 300B, namely a first connection unit to which the EVSE unit 300A is connected, and second connection unit to which the EVSE unit 300B is connected. The charger 61 may perform separate power conversions on first power input from the first connection unit and second power input from the second connection unit. The vehicle 100 may include a plurality of inlets so as to be compatible with a plurality of types of power supply methods (e.g., AC and DC methods).

When the vehicle 100 goes into the first plugged-in state, a first cable connection signal (signal indicating identification information of the EVSE unit 300A) is sent from the first control device of the EVSE unit 300A to the ECU 150. When the vehicle 100 goes into the second plugged-in state, a second cable connection signal (signal indicating identification information of the EVSE unit 300B) is sent from the second control device of the EVSE unit 300B to the ECU 150. The ECU 150 according to the present embodiment determines whether the vehicle 100 is in the first plugged-in state, the second plugged-in state, or the plugged-out state based on the cable connection signal. This determination process is also referred to as the "plugged-in discrimination process."

Figure 4:
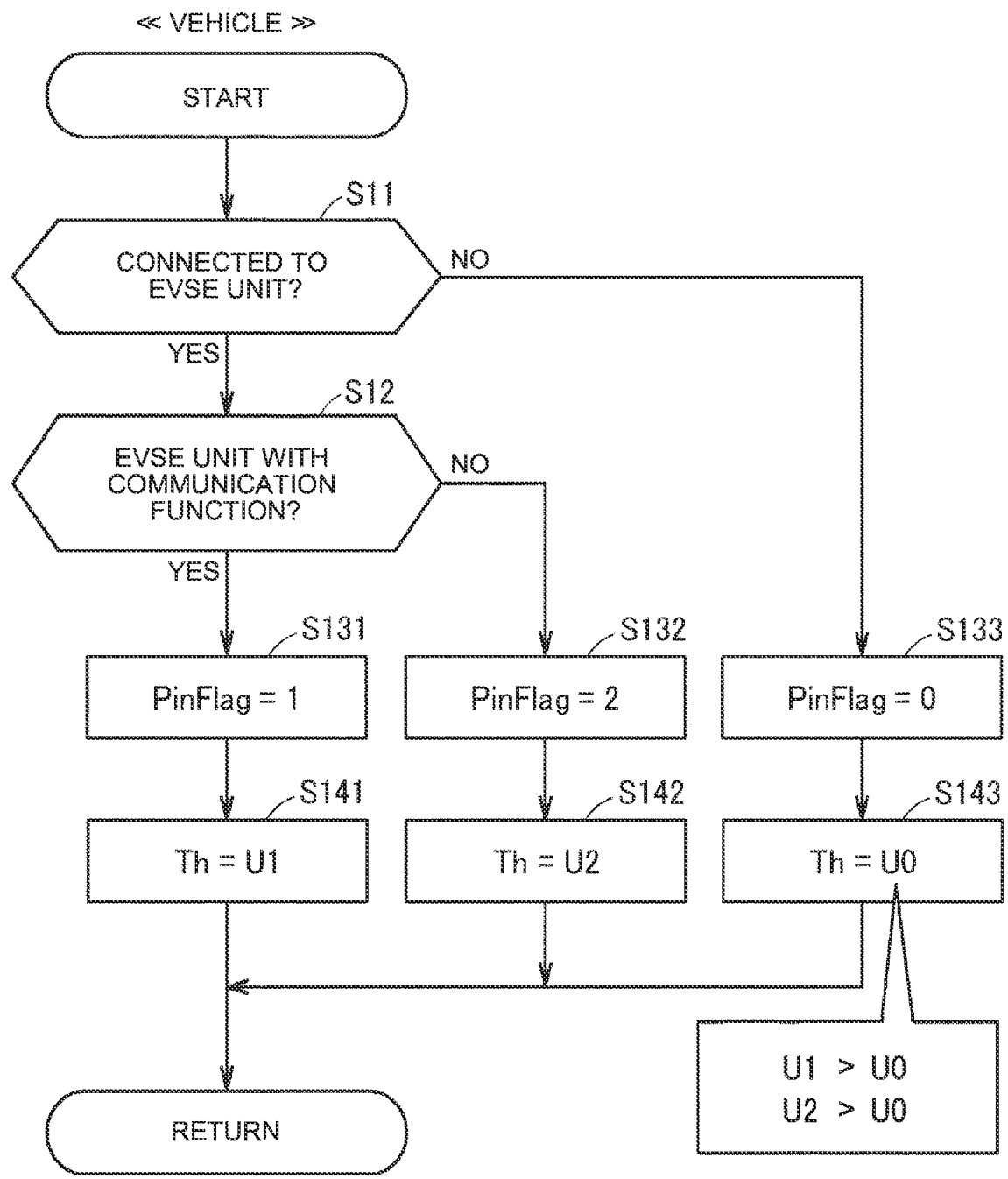
FIG. 4 is a flowchart of a plugged-in determination process that is performed by a control device of the vehicle shown in FIG. 2.

FIG. 4 is a flowchart of the plugged-in determination process that is performed by the ECU 150. In the following description, the term "step" in the flowchart is abbreviated as "S."

Referring to FIG. 4 together with FIGS. 1 to 3, the ECU 150 determines in S11 whether the vehicle 100 is electrically connected to an EVSE unit. Specifically, when the ECU 150 has received a first or second cable connection signal, the ECU 150 determines that the vehicle 100 is electrically connected to an EVSE unit (YES in S11). When the ECU 150 has not received any cable connection signal, the ECU 150 determines that the vehicle 100 is not electrically connected to any EVSE unit (NO in S11). The ECU 150 having received a cable connection signal means that the vehicle 100 is electrically connected to an EVSE unit (i.e., the vehicle is in the plugged-in state).

When YES in S11, the ECU 150 determines in S12 whether the EVSE unit electrically connected to the vehicle 100 is a first EVSE unit (e.g., the EVSE unit 300A shown in FIG. 3). Specifically, when the ECU 150 has received a first cable connection signal, the ECU 150 determines that the vehicle 100 is electrically connected to a first EVSE unit. When the ECU 150 has received a second cable connection signal, the ECU 150 determines that the vehicle 100 is electrically connected to a second EVSE unit (e.g., the EVSE unit 300B shown in FIG. 3). The ECU 150 can thus distinguish between a first EVSE unit (first power supply equipment having a function to communicate with the management device 1000) and a second EVSE unit (second power supply equipment that does not have a function to communicate with the management device 1000).

The ECU 150 sets PinFlag and Th based on the determination results in S11 and S12. Specifically, PinFlag and Th are stored in, for example, the storage device 153. PinFlag is a flag indicating the result of the plugged-in identification process. PinFlag has values (1, 2, and 0) corresponding to the first plugged-in state, the second plugged-in state, and the plugged-out state. Th is an upper limit value of the cumulative number of communications N that will be described below (see S31 in FIG. 6). As will be described in detail later, when the cumulative number of communications N reaches Th, a communication restriction condition is satisfied, and wireless communication of the DCM 92c is prohibited. The smaller the Th, the more easily the communication restriction condition is satisfied.

When the vehicle 100 is electrically connected to a first EVSE unit (YES in S12), the ECU 150 sets PinFlag to "1" (value corresponding to the first plugged-in state) in S131, and sets Th to an upper limit value U1 (hereinafter sometimes simply referred to as "U1") in S141. When the vehicle 100 is electrically connected to a second EVSE unit (NO in S12), the ECU 150 sets PinFlag to "2" (value corresponding to the second plugged-in state) in S132, and sets Th to an upper limit value U2 (hereinafter sometimes simply referred to as "U2") in S142. When NO in S11, the ECU 150 sets PinFlag to "0" (value corresponding to the plugged-out state) in S133, and sets Th to an upper limit value U0 (hereinafter sometimes simply referred to as "U0") in S143.

U0 is Th in the plugged-out state, and is an example of the "first upper limit value" according to the present disclosure. Each of U1 and U2 is Th in the plugged-in state, and is an example of the "second upper limit value" according to the present disclosure. U1 and U2 are greater than U0. In the present embodiment, U1 and U2 are the same value. However, the present disclosure is not limited to this, and U1 and U2 may be different values. For example, in the second plugged-in state, the vehicle 100 cannot communicate with the server 200 through an EVSE unit. Therefore, U2 may be set to a value greater than U1 so that the vehicle 100 is more likely to communicate with the server 200 through the DCM 92c.

When the ECU 150 finishes setting PinFlag and Th in S131 to S133 and S141 to S143, the routine returns to the first step (S11). The series of steps shown in FIG. 4 is repeatedly performed in a predetermined cycle. PinFlag and Th are updated as needed by the series of steps shown in FIG. 4.

The method for detecting connection of a charging cable is not limited to the above method using a cable connection signal, and any desired method may be used. For example, the inlet 60 may be equipped with a sensor that detects connection of a charging cable (e.g., limit switch, proximity sensor, or photoelectric sensor). The inlet 60 may be equipped with a connection detection circuit that detects connection of a charging cable based on a voltage change that occurs when a charging cable is connected to the inlet 60. The connection detection circuit may be configured so that the electrical resistance (e.g., partial resistance) varies among when the charging cable of a first EVSE unit is connected to the inlet 60, when the charging cable of a second EVSE unit is connected to the inlet 60, and when no charging cable is connected to the inlet 60.

Referring back to FIG. 2 together with FIG. 1, the vehicle 100 in the plugged-in state can perform an external charge (i.e., a charge of the main battery 11 with power from outside the vehicle). The vehicle 100 can perform power balancing of the power grid PG (FIG. 1) by the external charge. For example, the power for the external charge is supplied from the power grid PG to the inlet 60 through an EVSE unit. The charging relay 62 is closed (connected) when the external charge is performed. The charging relay 62 is opened (disconnected) when the external charge is not performed.

The ECU 150 is configured so that the charge end time and target SOC (SOC at the end of charging) for a timer charge can be set in the ECU 150. The ECU 150 with the charge end time and target SOC set therein performs a timer charge. A timer charge is a charge that is performed according to the reserved charge schedule. Specifically, in a timer charge of the vehicle 100, the ECU 150 performs charge control of the main battery 11 (controls the charger 61) so that the SOC of the main battery 11 reaches the target SOC at the scheduled charge end time.

Each vehicle in the vehicle group 1 is configured to take reservations for a timer charge from the user and perform a scheduled timer charge. Each vehicle in the vehicle group 1 sends charge reservation information to the server 500. The charge reservation information indicates whether a timer charge is scheduled for the vehicle. The charge reservation information also indicates the set charge end time and target SOC for the vehicle. Each vehicle in the vehicle group 1 may send charge reservation information to the server 500 when a timer charge reservation is made. Those vehicles in the vehicle group 1 for which a timer charge is not scheduled perform an immediate charge. An immediate charge is an external charge that is started as soon as the vehicle goes into the plugged-in state. The vehicle 100 also starts a charge as instructed by the user. For example, the user of the vehicle 100 can instruct the ECU 150 to start a charge by operating a mobile terminal UT.

In the present embodiment, those vehicles in the vehicle group 1 for which a timer charge is scheduled permit the server 200 to remotely control the energy storage device. On the other hand, those vehicles in the vehicle group 1 for which a timer charge is not scheduled do not permit the server 200 to remotely control the energy storage device. However, the condition for permitting remote control is not limited to the above condition, and can be changed as appropriate.

The mobile terminal UT is a terminal carried by the user of the vehicle 100. In the present embodiment, the mobile terminal UT is a smartphone with a touch panel display. The smartphone includes a built-in computer. The vehicle 100 further includes a communication I/F for direct communication with the mobile terminal UT located inside the vehicle or within a range around the vehicle. The vehicle 100 and the mobile terminal UT may perform short-range communication such as wireless local area network (LAN), near field communication (NFC), or Bluetooth (registered trademark). The mobile terminal UT may be any desired mobile terminal such as laptop, tablet terminal, wearable device (e.g., smart watch or smart glasses), or electronic key. Any communication method can be used for communication between the vehicle 100 and the mobile terminal UT.

A vehicle system including the ECU 150 (system that controls the vehicle 100) is turned on (operated) and off (stopped) when the user operates a start switch 70. For example, the start switch 70 is mounted in the vehicle cabin of the vehicle 100. The vehicle system is started when the start switch 70 is turned on. The vehicle system is stopped when the start switch 70 is turned off while the vehicle system is in operation. An operation of turning off the start switch 70 is prohibited while the vehicle 100 is traveling. The start switch of the vehicle is commonly referred to as "power switch" or "ignition switch."

Referring back to FIG. 1, the server 200 is a computer that belongs to an aggregator. An aggregator is an electric utility that bundles a plurality of distributed energy resources (DERs) to provide an energy management service. The server 200 is configured to control the vehicle group 1. Each vehicle in the vehicle group 1 includes an energy storage device that can be electrically connected to the power grid PG (external power supply). Each vehicle in the vehicle group 1 can thus function as a DER. The server 200 may cause the DERs (e.g., each vehicle in the vehicle group 1) to function as a virtual power plant (VPP) by remotely and integratively controlling the DERs. The server 500 may belong to the aggregator, or may belong to an automaker.

The server 200 may perform demand response (DR) for each DER in order to integratively control the DERs as a VPP. Power balancing of the power grid PG is requested to the DERs by DR. The server 200 may use DR to cause a plurality of DERs (e.g., each vehicle in the vehicle group 1) to perform power balancing of the power grid PG requested from the server 700 or power balancing of the power grid PG successfully won on the electricity market.

By participating in DR (power balancing), the DERs can give flexibility and adequacy to the power grid PG. Administrators of the DERs participating in DR (e.g., vehicle users) permit the server 200 to remotely control the DERs. In the situation where remote control of the DERs by the server 200 is permitted, the server 200 can remotely control the DERs to cause the DERs to perform a charge or discharge for power balancing of the power grid PG. For example, in the vehicle 100, the ECU 150 controls the charger 61 according to a command from the server 200. However, even when the server 200 sends commands to the DERs, the DERs cannot perform power balancing by remote control when the DERs are not ready for power balancing.

Any desired type of power balancing can be performed by the DERs. Power balancing may be, for example, supply and demand balancing, power supply stabilization, load following, or frequency balancing. The DERs may operate as balancing forces or reserve powers for the power grid PG by remote control. DR is broadly classified into upward DR and downward DR. Upward DR is basically DR that requests an increase in demand. However, when the DERs receiving a request are power generating equipment, upward DR may request supply curtailment to the DERs. Downward DR is DR that requests reduction in demand or backfeeding.

In the present embodiment, the server 500 holds information on each vehicle in the vehicle group 1 (hereinafter also referred to as "vehicle information"). The server 200 performs vehicle control (remote control) for power balancing of the power grid PG by using the vehicle information acquired from the server 500.

Figure 6:
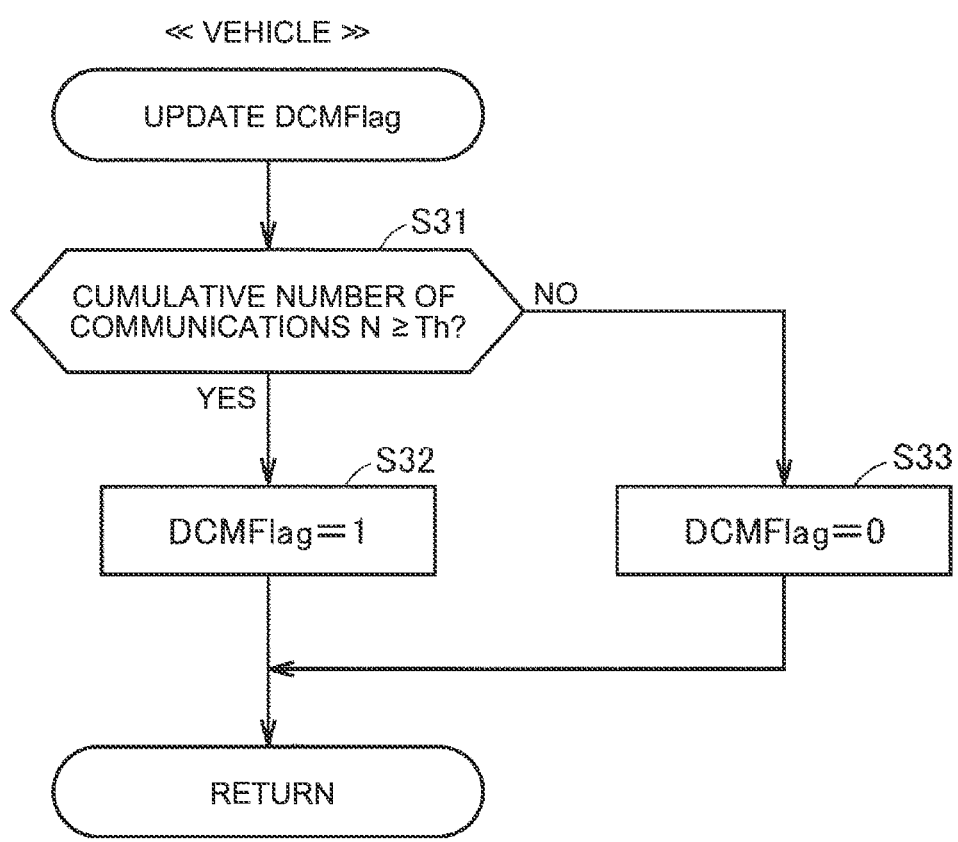
FIG. 6 is a flowchart showing in detail a process of restricting wireless communication shown in FIG. 5.

The vehicle information held by the server 500 is distinguished by vehicle IDs (vehicle identification information). The vehicle information includes, for example, a charging location, the specifications of an EVSE unit installed at the charging location, location information of the vehicle, the SOC of the in-vehicle battery, charge reservation information, the state (ON/OFF) of the vehicle system, information set in the navigation system (e.g., travel route to the destination), vehicle trip history data (e.g., data in which the location of the vehicle is associated with time for vehicle's daily trips), PinFlag and Th shown in FIG. 4, and DCMFlag (FIG. 6). When each vehicle has different specifications, the specifications of each vehicle (e.g., specifications related to charging) may be registered in advance in the server 500. The locations of the home and workplace of the user of the vehicle 100 may be registered in advance as charging locations for the vehicle 100 in the server 500.

The vehicle information is saved in the storage device of the server 500 and is updated as needed. The server 500 periodically communicates with each vehicle in the vehicle group 1 and receives the vehicle information from each vehicle as needed. The server 500 updates the vehicle information in the storage device based on the received latest vehicle information.

Figure 5:
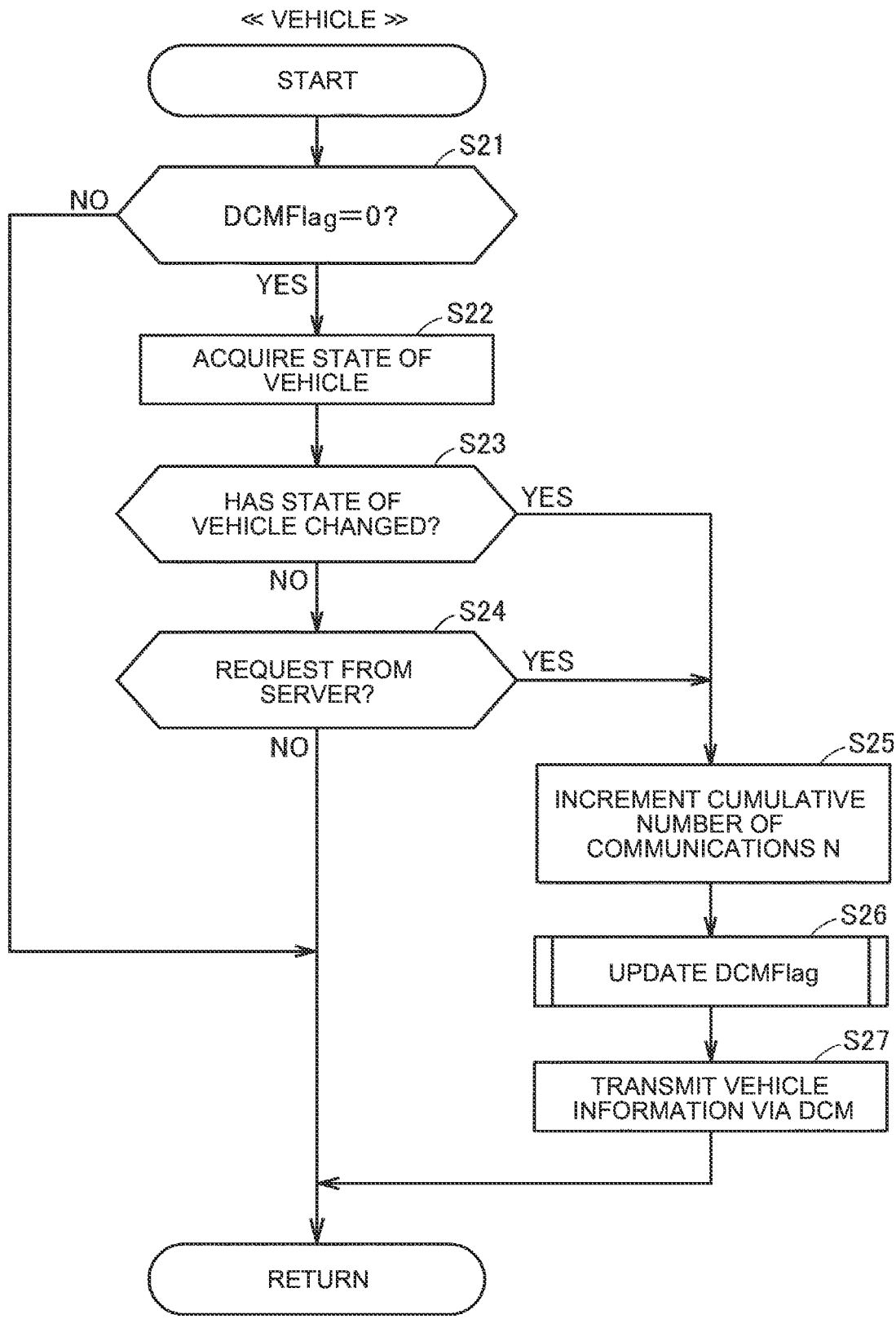
FIG. 5 is a flowchart of a process for wireless communication with a management device that is performed by the vehicle shown in FIG. 2.

FIG. 5 is a flowchart of a process related to wireless communication of the vehicle 100 with the server 500. The process in this flowchart is repeatedly performed in a predetermined cycle.

Referring to FIG. 5 together with FIGS. 1 to 3, the ECU 150 determines in S21 whether DCMFlag is "0." For example, DCMFlag is stored in the storage device 153. DCMFlag is a flag indicating whether the communication restriction condition is satisfied. DCMFlag being "1" means that the communication restriction condition is satisfied. DCMFlag being "0" means that the communication restriction condition is not satisfied.

When the communication restriction condition is not satisfied (YES in S21), the ECU 150 acquires the state of the vehicle 100 in S22. In the present embodiment, the ECU 150 acquires, in S22, the location of the vehicle 100, the SOC of the main battery 11, the charge reservation information, the set parameters in the NAVI 92b, and the values of PinFlag and Th (see FIG. 4). However, the present disclosure is not limited to this, and the state of the vehicle 100 to be acquired in S22 can be set as desired. The ECU 150 may further acquire the detection values from various sensors mounted on the vehicle 100 in S22.

Thereafter, in S23, the ECU 150 determines whether the state of the vehicle 100 acquired in S22 has changed from the previous value. Specifically, the ECU 150 compares the state acquired in S22 of the current routine with the state acquired in S22 of the previous routine. When the amount of change in state from the previous routine to the current routine is greater than a predetermined level, the ECU 150 determines in S23 that the state of the vehicle 100 has changed from the previous value (YES in S23). When the amount of change in state from the previous routine to the current routine is not greater than the predetermined level, the ECU 150 determines in S23 that the state of the vehicle 100 has not changed from the previous value (NO in S23). For example, since the location of the vehicle 100 and the SOC of the main battery 11 change significantly while the vehicle 100 is traveling, the ECU 150 determines in S23 that the state of the vehicle 100 has changed from the previous value (YES in S23). Since the SOC of the main battery 11 changes significantly during an external charge, the ECU 150 determines in S23 that the state of the vehicle 100 has changed from the previous value (YES in S23). Moreover, when the charge reservation information (e.g., charge end time and target SOC for a timer charge) has been changed, the ECU 150 determines in S23 that the state of the vehicle 100 has changed from the previous value (YES in S23). When the set parameters in the NAVI 92b (e.g., destination) have been changed, the ECU 150 determines in S23 that the state of the vehicle 100 has changed from the previous value (YES in S23). When either PinFlag or Th has been changed, the ECU 150 determines in S23 that the state of the vehicle 100 has changed from the previous value (YES in S23).

When the amount of change in state of the vehicle 100 is small (NO in S23), the ECU 150 determines in S24 whether the ECU 150 has received a request for vehicle information from the management device 1000 (e.g., server 200 or 500). When the amount of change in state of vehicle 100 is large (YES in S23), or when the management device 1000 has requested vehicle information from the vehicle 100 (YES in S24), the routine proceeds to S25.

In S25, the ECU 150 increments the cumulative number of communications N. The cumulative number of communications N is thus increased by one (counted up). In other words, the cumulative number of communications N is updated to the current value plus one. The cumulative number of communications N is stored in, for example, the storage device 153. The cumulative number of communications N is a parameter indicating the cumulative number of communications of the DCM 92c. In the present embodiment, the ECU 150 increments the cumulative number of communications N (S25) every time the DCM 92c performs wireless communication (YES in S23 or S24). When a predetermined reset condition is satisfied (YES in S41 in FIG. 7 that will be described later), the ECU 150 resets the cumulative number of communications N to the initial value (zero).

Thereafter, in S26, the ECU 150 updates DCMFlag based on the cumulative number of communications N FIG. 6 is a flowchart showing the details of S26.

Referring to FIG. 6 together with FIGS. 1 to 3, the ECU 150 determines in S31 whether the cumulative number of communications N is equal to or greater than Th. Th is set in S141 to S143 in FIG. 4. In other words, Th is set to one of U0, U1, or U2. When the cumulative number of communications N is equal to or greater than Th (YES in S31), the ECU 150 sets DCMFlag to "1" in S32. When the cumulative number of communications N is less than Th (NO in S31), the ECU 150 sets DCMFlag to "0" in S33. After DCMFlag is set in S32 or S33, the routine proceeds to S27 in FIG. 5.

Referring back to FIG. 5 together with FIGS. 1 to 3, the ECU 150 transmits predetermined vehicle information to the server 500 via the DCM 92c (wireless communication device) in S27. In other words, the DCM 92c performs wireless communication in S27. In the present embodiment, the predetermined vehicle information that is transmitted in S27 includes the value of DCMFlag (0 or 1) in addition to the state of the vehicle 100 acquired in S22. In the present embodiment, DCMFlag is updated (S26) before the DCM 92c transmits the vehicle information (S27). Therefore, the management device 1000 can be notified of the fact that wireless communication of the DCM 92c has been prohibited (DCMFlag is set to 0). The vehicle information that is transmitted in S27 is not limited to the above information, and can be changed as appropriate.

After S27 is performed, the routine returns to the first step (S21). When DCMFlag is "0," the vehicle 100 transmits the latest state of the vehicle 100 to the server 500 by wireless communication (S27) every time the state of the vehicle 100 changes by an amount greater than the predetermined level (YES in S23). When the vehicle 100 has received a request from the management device 1000 (YES in S24), the vehicle 100 also transmits the latest state of the vehicle 100 to the server 500 by wireless communication (S27). The DCM 92c is thus configured to transmit the state of the vehicle 100 to the management device 1000 as needed.

When NO in both S23 and S24, wireless communication of the DCM 92c (S27) is not performed, and the routine returns to the first step (S21). When DCMFlag is "1" (NO in S21), wireless communication of the DCM 92c (S27) is also not performed, and S21 is repeated. As described above, when DCMFlag is "1" (NO in S21), wireless communication of the DCM 92c is prohibited.

As described above, in the plugged-out state (when the power grid PG and the vehicle 100 are not electrically connected), the communication restriction condition is satisfied (S32 in FIG. 6) when the cumulative number of communications N of the DCM 92c reaches the first upper limit value (U0 in S143 in FIG. 4) (YES in S31 in FIG. 6). The ECU 150 then prohibits wireless communication of the DCM 92c. In the plugged-in state (when the power grid PG and the vehicle 100 are electrically connected), the communication restriction condition is satisfied (S32 in FIG. 6) when the cumulative number of communications N of the DCM 92c reaches the second upper limit value that is greater than the first upper limit value (U1 or U2 in S141 or S142 in FIG. 4) (YES in S31 in FIG. 6). The ECU 150 then prohibits wireless communication of the DCM 92c.

Figure 7:
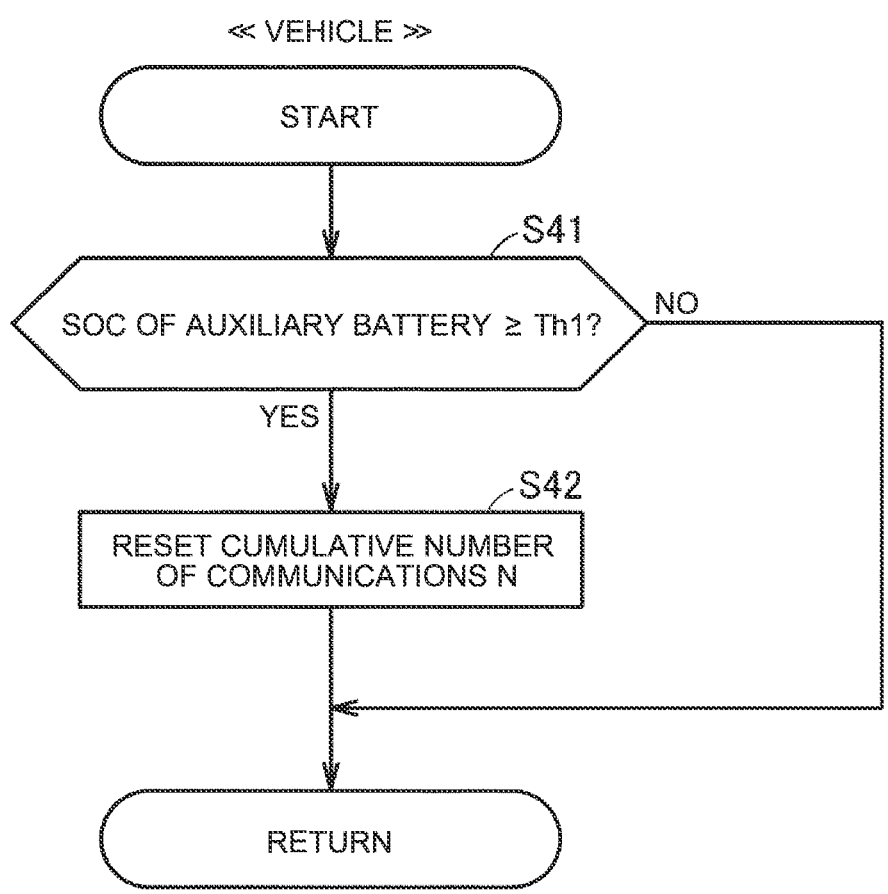
FIG. 7 is a flowchart of a process for resetting the cumulative number of communications of a wireless communication device in a communication control method according to the embodiment of the present disclosure.

FIG. 7 is a flowchart of a process for resetting the cumulative number of communications N. The process in this flowchart is repeatedly performed in a predetermined cycle. The series of steps shown in FIG. 7 is performed in parallel with the series of steps shown in FIGS. 4 and 5.

Referring to FIG. 7 together with FIGS. 1 to 3, the ECU 150 determines in S41 whether the SOC of the auxiliary battery 82 is equal to or greater than a predetermined first threshold (hereinafter referred to as "Th1"). When the SOC of the auxiliary battery 82 is equal to or greater than Th1 (YES in S41), the ECU 150 resets the cumulative number of communications N to the initial value (zero) in S42. The routine then returns to the first step (S41). When the SOC of the auxiliary battery 82 is less than Th1 (NO in S41), the cumulative number of communications N is be reset, and the routine returns to the first step (S41). As described above, when the SOC of the auxiliary battery 82 is Th1 or higher, the cumulative number of communications N is reset. Therefore, the communication restriction condition is not satisfied.

Figure 8:
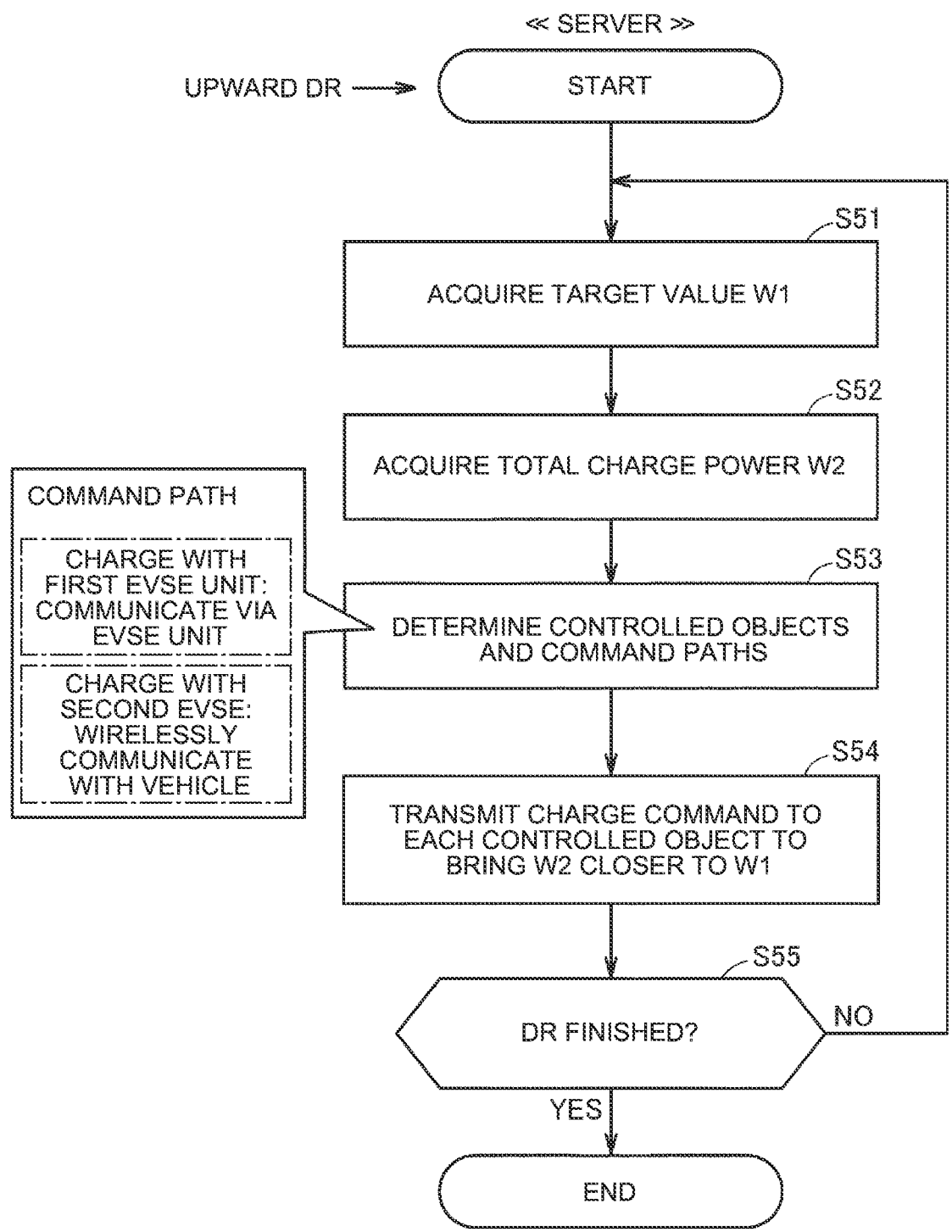
FIG. 8 is a flowchart of a process for controlling a vehicle group for power balancing of an external power supply that is performed by the management device according to the embodiment of the present disclosure.

The vehicle group 1 in the present embodiment is configured to perform power balancing of the power grid PG in response to a request from the server 200. FIG. 8 is a flowchart of a process for controlling the vehicle group 1 for power balancing of the power grid PG. This process is performed by the server 200. For example, when the server 200 starts the series of steps shown in FIG. 8 described below when it receives a request to increase demand from the server 700. In the present embodiment, upward DR for the vehicle group 1 is performed by the series of steps shown in FIG. 8.

Referring to FIG. 8 together with FIGS. 1 to 3, the server 200 acquires a target value for charge control (hereinafter referred to as "target value W1") in S51. For example, the server 200 may acquire the target value W1 from the server 700. The server 700 may determine the target value W1 for power balancing of the power grid PG and request the server 200 to bring the total charge power W2 described below (S52) closer to the target value W1.

Thereafter, in S52, the server 200 acquires the total charge power of the vehicle group 1 (hereinafter referred to as "total charge power W2"). The charge power of the energy storage device of each vehicle in the vehicle group 1 (more specifically, the charge power of the energy storage devices using the power supplied from the power grid PG) may be measured by a watt-hour meter installed at the charging location, and may be sent to the server 200. The watt-hour meter installed at the charging location may be a smart meter installed at a network connection point, or may be a built-in watt-hour meter of an EVSE unit. The total charge power W2 is the total value of the charge power of the vehicle group 1 as measured by the watt-hour meters installed at each charging location.

Subsequently, in S53, the server 200 determines a controlled object for power balancing and a command path to the controlled object. Specifically, the server 200 acquires the current state (vehicle information) of each vehicle in the vehicle group 1 from the server 500. The server 200 then selects controlled objects from the vehicle group 1. The server 200 selects those vehicles that meet predetermined requirements (hereinafter also referred to as "standby requirements") (i.e., a vehicle that is ready for power balancing) as controlled objects.

The standby requirements for the vehicle 100 according to the present embodiment include the following requirements: PinFlag is "1" or "2" (first SBY requirement), the SOC of the main battery 11 is within a predetermined SOC range (second SBY requirement), DCMFlag is "0" (third SBY requirement), and a timer charge is scheduled for the vehicle 100 (fourth SBY requirement). In order to meet the standby requirements, the vehicle 100 needs to meet all of the first to fourth SBY requirements.

Meeting the first SBY requirement means that the vehicle 100 is electrically connected to the power grid PG. The vehicle 100 in the plugged-in state is electrically connected to the power grid PG via the first or second EVSE unit. Meeting the second SBY requirement means that the current remaining capacity of the main battery 11 is within a range suitable for the requested power balancing. For example, the predetermined SOC range is set by the server 200. Meeting the third SBY requirement means that wireless communication of the DCM 92c is permitted. The vehicle 100 that meets the third SBY requirement transmits the state of the vehicle 100 to the server 500 as needed (see FIG. 5). This makes it easier for the server 200 to accurately grasp the state of the vehicle 100 that meets the third SBY requirement. Meeting the fourth SBY requirement means that remote control of the vehicle 100 by the server 200 is permitted. The server 200 performs remote control to cause the controlled objects to perform power balancing of the power grid PG in S54 that will be described later. The standby requirements are not limited to the above requirements, and can be changed as appropriate. For example, either or both of the second and third SBY requirements may be omitted. In forms in which each vehicle has different specifications, different standby requirements may be set for each vehicle.

In S53, the server 200 selects either a first path or a second path as a command path for each controlled object according to whether the controlled object is connected to a first EVSE unit or a second EVSE unit. The first path is a communication path from the server 200 to the controlled object through a first EVSE unit. The second path is a communication path that directly connects the server 200 and the controlled object by wireless communication without through a second EVSE unit. For example, when a vehicle 100 connected to a first EVSE unit (PinFlag="1") is selected as a controlled object, the first path is selected as a command path for this vehicle 100. When a vehicle 100 connected to a second EVSE unit (PinFlag="2") is selected as a controlled object, the second path is selected as a command path for this vehicle 100. It is not essential that the controlled objects be connectable to both a first EVSE unit and a second EVSE unit. The controlled objects may only be connectable to either a first EVSE unit or a second EVSE unit.

Once the controlled objects and command paths for each controlled object are determined in S53, the server 200 then controls the controlled objects to bring the total charge power W2 closer to the target value W1 in SM. Specifically, the server 200 determines the charge power to be allocated to the controlled objects (hereinafter referred to as "requested charge power") based on the target value W1 and the total charge power W2, and sends a charge command indicating the requested charge power to the controlled objects. The charge command is sent from the server 200 to the controlled objects through the command paths (first or second paths) determined in S53. The server 200 determines the requested charge power for each controlled object, and sends a charge command to each controlled object. The controlled objects having received a charge command from the server 200 perform charge control of the energy storage device according to the charge command. In other words, the controlled objects control the in-vehicle charger so that the charge power of the energy storage device gets closer to the requested charge power.

Instead of the requested charge power, the server 200 may determine a charge command for ON (execute) or OFF (stop) for each controlled object. The server 200 may perform charge ON-OFF control on each controlled object so as to bring the total charge power W2 closer to the target value W1. The server 200 may determine the charge schedule for each controlled object by using the charge reservation information of each controlled object so that power balancing (e.g., upward DR) of the power grid PG is performed while meeting the requirements for the charge end time and target SOC for a timer charge. The server 200 may then send a charging command to each controlled object to meet the determined charge schedule. The server 200 may predict movement of each controlled object by using the vehicle information acquired from the server 500, and may change the schedule (charge start time and charge end time) for the reserved timer charge based on the movement prediction results. For example, when a controlled object is in a predetermined charge mode, the controlled object may permit the server 200 to change the charge schedule.

Thereafter, the server 200 determines in S55 whether the DR is finished. The server 200 determines whether the DR is finished based on whether the period of power balancing requested by the server 700 (DR period) has passed. When DR is not finished (NO in S55), the routine returns to the first step (S51). While the DR continues (within the DR period), S51 to S54 are repeatedly performed so that the controlled objects perform power balancing of the power grid PG.

When the DR is finished (YES in S55), the series of steps shown in FIG. 8 ends. After the DR is finished, the aggregator may give an incentive to the users of the vehicles that performed power balancing (controlled objects).

Figure 9:
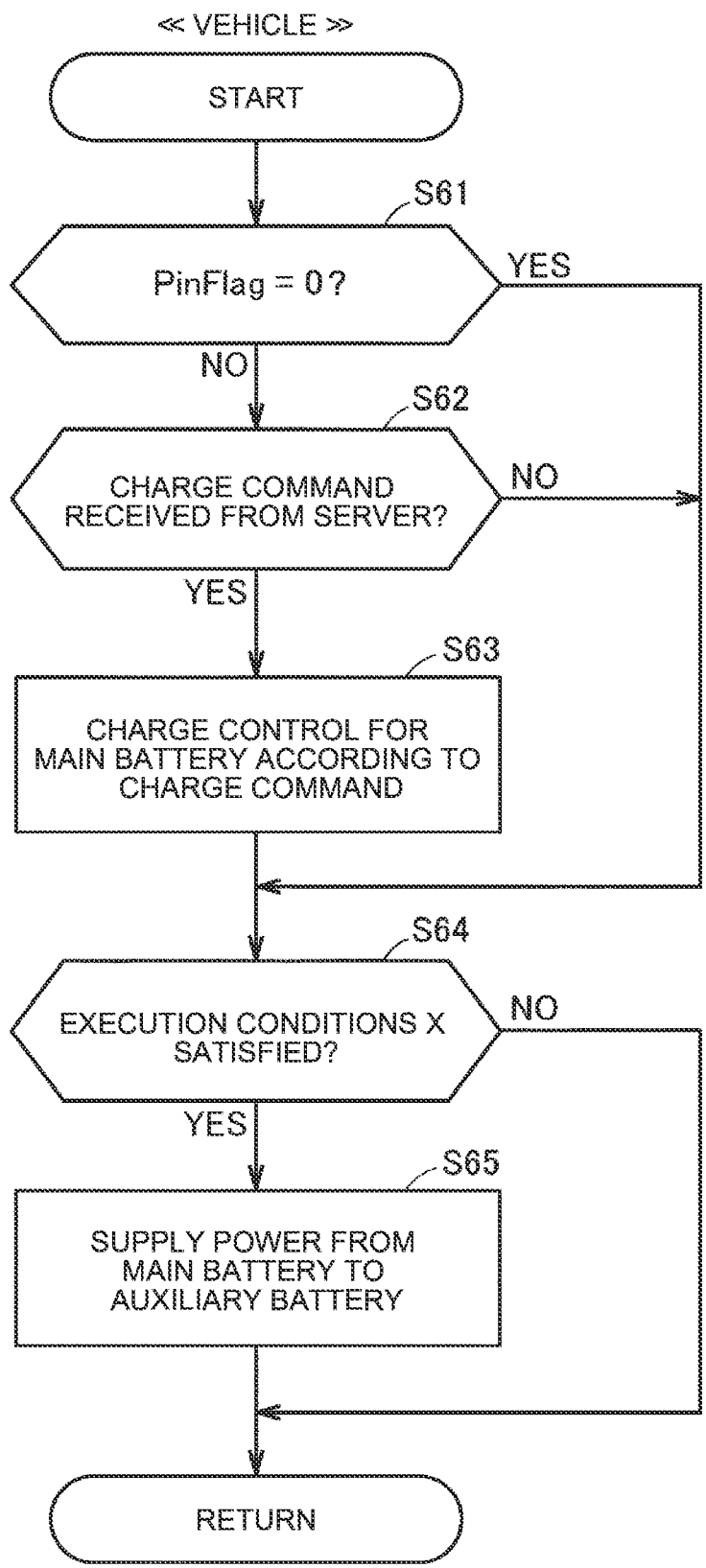
FIG. 9 is a flowchart of a process that is periodically performed by the vehicle according to the embodiment of the present disclosure.

FIG. 9 is a flowchart of a process that is periodically performed by the vehicle 100. Referring to FIG. 9 together with FIGS. 1 to 3, the ECU 150 determines in S61 whether PinFlag is "0." When PinFlag is not "0" (NO in S61), the routine proceeds to S62. When PinFlag is "0" (YES in S61), the routine proceeds to S64.

When PinFlag is not "0" (i.e., the vehicle 100 is in the plugged-in state), the ECU 150 determines in S62 whether the ECU 150 has received a charge command (S54 in FIG. 8) from the server 200. When the vehicle 100 has received a charge command from the server 200 (YES in S62), the ECU 150 performs an external charge of the main battery 11 according to the received charge command in S63. During the external charge of the main battery 11, the power grid PG and the main battery 11 are electrically connected and the charger 61 is controlled by the ECU 150.

When the ECU 150 performs an external charge of the main battery 11 according to a charge command from the server 200 by using the power supplied from the power grid PG to the vehicle 100 through the EVSE unit 300A (FIG. 3), the ECU 150 communicates with the server 200 through the first path (S53 in FIG. 8). In other words, the ECU 150 communicates with the server 200 through the EVSE unit 300A. Power balancing of the power grid PG is performed by this external charge of the main battery 11 that is performed according to the charge command.

When the ECU 150 performs an external charge of the main battery 11 according to a charge command from the server 200 by using the power supplied from the power grid PG to the vehicle 100 through the EVSE unit 300B (FIG. 3), the ECU 150 communicates with the server 200 through the second path (S53 in FIG. 8). In other words, the ECU 150 communicates with the server 200 through the DCM 92c. The DCM 92c is thus configured to receive a charge command for power balancing of the power grid PG from the management device 1000 by wireless communication. Power balancing of the power grid PG is performed by this external charge of the main battery 11 that is performed according to the charge command (remote control of the vehicle 100 by the server 200).

After the charge control (S63), the routine proceeds to S64. When NO in S62, the routine skips S63 and proceeds to S64. In S64, the ECU 150 determines whether predetermined execution conditions (hereinafter also referred to as "execution conditions X") are satisfied. The execution conditions X are charge execution conditions for the auxiliary battery 82. In the present embodiment, the execution conditions X include the following conditions: the SOC of the main battery 11 is equal to or greater than a predetermined first SOC value (first SOC requirement), and the SOC of the auxiliary battery 82 is equal to or less than a predetermined second SOC value (second SOC requirement). In order for the execution conditions X to be satisfied, both the first SOC requirement and the second SOC requirement need be met. However, the present disclosure is not limited to this, and the execution conditions X can be set as desired.

When the execution conditions X are satisfied (YES in S64), the ECU 150 controls the SMR 12 and the DC-to-DC converter 81 so that power is supplied from the main battery 11 to the auxiliary battery 82 in S65. The main battery 11 is thus configured to supply power to the auxiliary battery 82.

After the auxiliary battery 82 is charged as described above (S65), the routine returns to the first step (S61). When the execution conditions X are not satisfied (NO in S64), the auxiliary battery 82 will not be charged (S65), and the routine returns to the first step (S61). The series of steps shown in FIG. 9 is repeatedly performed in a predetermined cycle.

Figure 10:
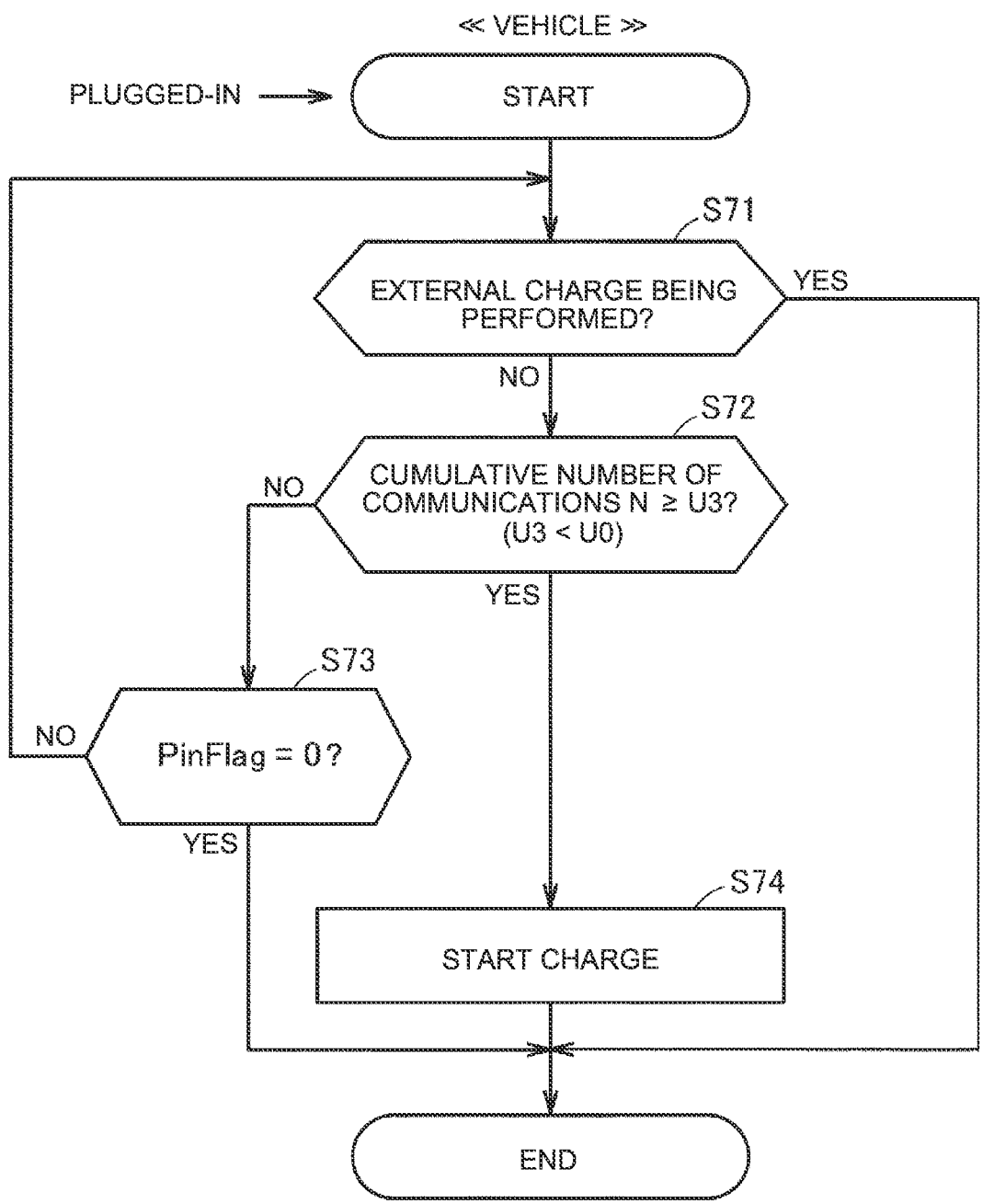
FIG. 10 is a flowchart of a process for charge start control that is performed by the vehicle according to the embodiment of the present disclosure.

FIG. 10 is a flowchart of a process for charge start control that is performed by the vehicle 100. The process shown in this flowchart is started when the vehicle 100 goes into the plugged-in state.

Referring to FIG. 10 together with FIGS. 1 to 3, the ECU 150 determines in S71 whether an external charge of the main battery 11 is being performed. When a timer charge is not scheduled for the vehicle 100, an immediate charge is performed. When an immediate charge has been performed, the ECU 150 determines that an external charge of the main battery 11 is being performed (YES in S71), and the series of steps shown in FIG. 10 ends. When an immediate charge is not performed, the ECU 150 determines that an external charge of the main battery 11 is not being performed (NO in S71), and the routine proceeds to S72.

In S72, the ECU 150 determines whether the cumulative number of communications N of the DCM 92c is equal to or greater than a predetermined value (hereinafter referred to as "U3") that is smaller than U0 (FIG. 4). The cumulative number of communications N is updated by the process of FIG. 5 described above. When the cumulative number of communications N is less than U3 (NO in S72), the ECU 150 determines in S73 whether the vehicle 100 has gone into the plugged-out state (PinFlag="0"). When the vehicle 100 remains in the plugged-in state (NO in S73), the routine returns to the first step (S71). On the other hand, when the vehicle 100 goes into the plugged-out state (YES in S73), the series of steps shown in FIG. 10 ends.

When the cumulative number of communications N of the DCM 92c reaches U3 (YES in S72) with no charge of the main battery 11 being performed (NO in S71) with the vehicle 100 being electrically connected to the power grid PG, the ECU 150 starts an external charge of the main battery 11 in S74. In S74, the main battery 11 is charged with the power supplied from the power grid PG.

After S74 is performed, the series of steps shown in FIG. 10 ends, and charge control, not shown, is started. Although details of the charge control will be omitted, the external charge of the main battery 11 continues until a predetermined end condition is satisfied. When the end condition is satisfied, the ECU 150 stops the external charge. For example, the end condition may be satisfied when the SOC of the main battery 11 becomes equal to or greater than a predetermined SOC value. The predetermined SOC value for the end condition may be set by the user.

As described above, the communication control method according to the present embodiment includes the processes shown in FIGS. 4 to 10. When the vehicle 100 (controlled object) is in the second plugged-in state, a charge command is sent from the server 200 to the vehicle 100 through the second path in S54 in FIG. 8. The vehicle 100 receives a control command (charge command) for power balancing of the power grid PG (external power supply) from the management device 1000 through the DCM 92c (wireless communication. When the vehicle 100 receives a control command, the ECU 150 determines in S62 in FIG. 9 that the ECU 150 has received a charge command from the server 200 (YES in S62). When the cumulative number of communications N of the DCM 92c (S25 in FIG. 5) reaches U0 (S143 in FIG. 4) with the power grid PG and the vehicle 100 not electrically connected to each other (S133 in FIG. 4) (YES in S31 in FIG. 6), the vehicle 100 prohibits wireless communication of the DCM 92c (NO in S21 in FIG. 5). When the cumulative number of communications N of the DCM 92c (S25 in FIG. 5) reaches U1 or U2 that is greater than U0 (S141 or S142 in FIG. 4) with the power grid PG and the vehicle 100 electrically connected to each other (S131 or S132 in FIG. 4) (YES in S31 in FIG. 6), the vehicle 100 prohibits wireless communication of the DCM 92c (NO in S21 in FIG. 5).

According to the above communication control method, the communication restriction condition is satisfied when the cumulative number of communications N reaches a predetermined value (U0, U1, or U2). Wireless communication of the DCM 92c is restricted when the communication restriction condition is satisfied. This reduces power consumption of the auxiliary battery 82, so that the auxiliary battery 82 is less likely to run short of power. When the communication restriction condition is satisfied, the ECU 150 may control a power supply circuit for the DCM 92c so as to reduce generation of driving power for the DCM 92c. In the above communication control method, the communication restriction condition is less easily satisfied when the power grid PG and the vehicle 100 are electrically connected to each other than when the power grid PG and the vehicle 100 are not electrically connected to each other. This makes it easier for the management device 1000 (e.g., server 200) to remotely control the vehicle 100 by wireless communication to perform vehicle control for power balancing of the power grid PG (e.g., charge control of the main battery 11).

The processes shown in FIGS. 4 to 10 can be changed as appropriate. For example, the process for restricting wireless communication is not limited to prohibition of wireless communication, and may be a process for limiting the frequency of wireless communications to a predetermined frequency or less. The ECU 150 may perform a series of steps shown in FIG. 11 instead of the process shown in FIG. 7.

Figure 11:
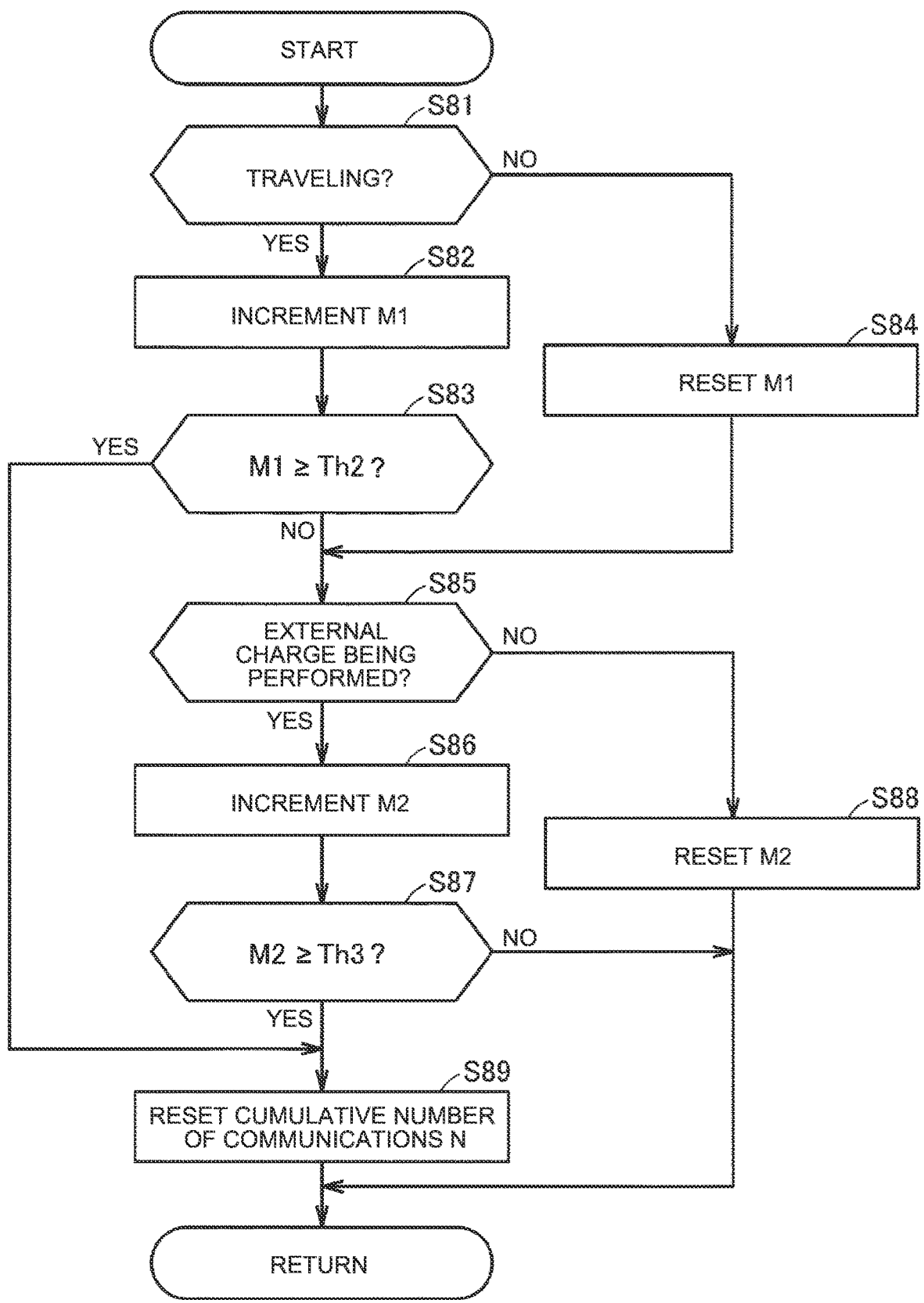
FIG. 11 is a flowchart of a modification of the process shown in FIG. 7.

FIG. 11 is a flowchart of a modification of the process shown in FIG. 7. In the vehicle 100 according to this modification as well, the main battery 11 supplies power to the auxiliary battery 82 while the main battery 11 is being charged with the power supplied from the power grid PG by the process shown in FIG. 10 described above. The auxiliary battery 82 is charged while the vehicle 100 is traveling. For example, when the vehicle 100 is traveling, the main battery 11 is regeneratively charged with the power generated by the MG 20. When the SOC of the auxiliary battery 82 becomes less than a predetermined value while the vehicle 100 is traveling, power is supplied from the main battery 11 to the auxiliary battery 82.

Referring to FIG. 11 together with FIGS. 1 to 3, the ECU 150 determines in S81 whether the vehicle 100 is traveling. When the vehicle 100 is traveling (YES in S81), the ECU 150 increments cumulative travel time M1 in S82. A predetermined unit time is thus added to the cumulative travel time M1. The cumulative travel time M1 is continuous travel time of the vehicle 100, and is stored in, for example, the storage device 153. Thereafter, the ECU 150 determines in S83 whether the cumulative travel time M1 is equal to or greater than a second threshold (hereinafter referred to as "Th2"). When the vehicle 100 is not traveling (NO at S81), the ECU 150 resets the cumulative travel time M1 to the initial value (zero seconds) in S84.

When the cumulative travel time M1 is equal to or greater than Th2 (YES in S83), the routine proceeds to S89. YES in S83 means that a condition for resetting the cumulative number of communications N is satisfied. When the cumulative travel time M1 is less than Th2 (NO in S83), the routine proceeds to S85.

In S85, the ECU 150 determines whether the vehicle 100 is performing an external charge. When the vehicle 100 is performing an external charge (YES in S85), the ECU 150 increments cumulative charge time M2 in S86. A predetermined unit time is thus added to the cumulative charge time M2. The cumulative charge time M2 is charge duration of the main battery 11 and is stored in, for example, the storage device 153. Thereafter, the ECU 150 determines in S87 whether the cumulative charge time M2 is equal to or greater than a third threshold (hereinafter referred to as "Th3"). When the vehicle 100 is not performing an external charge (NO in S85), the ECU 150 resets the cumulative charge time M2 to the initial value (zero seconds) in S88.

When the cumulative charge time M2 is equal to or greater than Th3 (YES in S87), the routine proceeds to S89. YES in S87 means that a condition for resetting the cumulative number of communications N is satisfied. When the cumulative charge time M2 is less than Th3 (NO in S87), the routine skips S89 and returns to the first step (S81).

When the condition for resetting the cumulative number of communications N is satisfied (YES in S83 or S87), the ECU 150 reset the cumulative number of communications N to the initial value (zero) in S89. After S89 is performed, the routine returns to the first step (S81). The series of steps shown in FIG. 11 is repeatedly performed in a predetermined cycle.

In the vehicle 100 according to the above modification, the ECU 150 resets the cumulative number of communications N of the DCM 92*c* (S89) when the continuous travel time (cumulative travel time M1) of the vehicle 100 becomes equal to or greater than the second threshold (Th2) (YES in S83). When the vehicle 100 travels continuously for a long period of time, the SOC of the auxiliary battery 82 is estimated to be sufficiently increased by the power supplied from the main battery 11. The ECU 150 also resets the cumulative number of communications N of the DCM 92*c* (S89) when the charge duration of the main battery 11 (cumulative charge time M2) becomes equal to or greater than the third threshold (Th3) (YES in S87). When the main battery 11 continues to be charged for a long period of time, the SOC of the auxiliary battery 82 is estimated to be sufficiently increased by the power supplied from the main battery 11. The monitoring module 82*a* may not always be able to detect the SOC of the auxiliary battery 82 accurately. In this respect, the above configuration (see FIG. 11) makes it possible to appropriately reset the cumulative number of communications N even in a form in which the SOC of the auxiliary battery 82 cannot be detected accurately. The DCM 92*c* (wireless communication device) becomes available when the cumulative number of communications N is reset.

In the process shown in FIG. 11 (particularly S82 to S84), a parameter indicating a continuous travel distance (km) of the vehicle 100 may be used instead of the cumulative travel time M1. In the process shown in FIG. 11 (particularly S86 to S88), a parameter indicating the amount of charge power (kWh) due to a continuous charge of the main battery 11 may be used instead of the cumulative charge time M2.

In the above embodiment, the vehicle 100 (ECU 150) distinguishes the first and second EVSE units from each other. However, the present disclosure is not limited to this, and the server 200 or 500 may determine whether the EVSE unit electrically connected to the vehicle 100 is the EVSE unit 300A (first EVSE unit) or the EVSE unit 300B (second EVSE unit) based on the charging location (i.e., the location of the vehicle 100 in the plugged-in state). For example, the server 200 or 500 may determine that the vehicle 100 is electrically connected to the EVSE unit 300A when the charging location is the workplace of the user of the vehicle 100. The server 200 or 500 may determine that the vehicle 100 is electrically connected to the EVSE unit 300B when the charging location is the home of the user of the vehicle 100. The charging location is not limited to the home and workplace, but can be changed as needed.

The power grid PG (external power supply) is not limited to a large-scale AC grid provided by an electric power company, and may be a microgrid or a direct current (DC) grid. The configuration of the management system is not limited to the configuration shown in FIG. 1. Another server (e.g., a server of a higher-level aggregator) may be provided between the server 700 and the server 200. The server 200 may communicate with the server 700 via other server. The functions of the server 500 may be implemented in the server 200 and the server 500 may be omitted. The server 200 may wirelessly communicate directly with the vehicle group 1. In the above embodiment, the on-premise servers (servers 200, 500 shown in FIG. 1) function as computers that manage the vehicle group 1. However, the present disclosure is not limited to this, and the functions of the servers 200, 500 (particularly the functions related to vehicle group management) may be implemented in a cloud by cloud computing. The management device 1000 may belong to other electric utility (e.g., a transmission system operator (TSO)) rather than the aggregator.

The configuration of the vehicle is not limited to the configuration described above (see FIG. 2). The vehicle may include a charger and discharger (charge and discharge circuit) that functions as both a charge circuit and a discharge circuit, instead of the charger 61. The inlet 60 may function as both a charge port and a discharge port. The vehicle may include an inlet that is only connectable to either the first power supply equipment or the second power supply equipment. The vehicle may output the power discharged from the in-vehicle battery to an external power supply via a discharge connector rather than via an EVSE unit. The in-vehicle battery may be replaceable. The vehicle may be an xEV other than a BEV (PHEV, FCEV, range extender EV, etc.).

The number of wheels is not limited to four, and may be three or may be five or more. The vehicle may be contactlessly rechargeable. The vehicle may equipped with a solar panel. The vehicle may be configured to perform autonomous driving or may have a flying function. The vehicle is not limited to a passenger car, and may be a bus or a truck. The vehicle may be a Mobility-as-a-Service (MaaS) vehicle. MaaS vehicles are vehicles that are managed by a MaaS operator. The vehicle may be an unmanned vehicle (e.g., a robotaxi, an automated guided vehicle (AGV), or an agricultural machine). The vehicle may be an unmanned or single-seater small-sized BEV (e.g., a micropallet).

The embodiment disclosed herein should be considered to be illustrative and not restrictive in all respects. The scope of the present disclosure is shown by the claims rather than by the above description of the embodiment and is intended to include all modifications within the meaning and scope equivalent to the claims.

What is claimed is:

1. A vehicle comprising:
a first energy storage device configured to be electrically connected to an external power supply;
a wireless communication device;
a second energy storage device configured to supply power to the wireless communication device; and
a control device configured to communicate with a management device outside the vehicle through the wireless communication device, wherein:
the first energy storage device is configured to supply power to the second energy storage device;
the control device is configured to restrict wireless communication of the wireless communication device when a communication restriction condition set using a cumulative number of communications of the wireless communication device is satisfied;
the communication restriction condition when the external power supply and the vehicle are not electrically connected to each other is set to be more easily satisfied than the communication restriction condition when the external power supply and the vehicle are electrically connected to each other; and
the communication restriction condition is not satisfied when a state of charge of the second energy storage device is equal to or greater than a first threshold.

2. The vehicle according to claim 1, wherein:
the control device is configured to prohibit wireless communication of the wireless communication device when the communication restriction condition is satisfied by the cumulative number of communications of the wireless communication device reaching a first upper limit value with the external power supply and the vehicle not being electrically connected to each other; and
the control device is configured to prohibit wireless communication of the wireless communication device when the communication restriction condition is satisfied by the cumulative number of communications of the wireless communication device reaching a second upper limit value that is greater than the first upper limit value with the external power supply and the vehicle being electrically connected to each other.

3. The vehicle according to claim 2, wherein:
the second energy storage device is configured to be charged while the vehicle is traveling; and
the control device is configured to reset the cumulative number of communications of the wireless communication device when a continuous travel distance or travel time of the vehicle becomes equal to or greater than a second threshold.

4. The vehicle according to claim 2, wherein:
the first energy storage device is configured to supply power to the second energy storage device while the first energy storage device is being charged with power supplied from the external power supply; and
the control device is configured to reset the cumulative number of communications of the wireless communication device when an amount of charge power or charge duration due to a continuous charge of the first energy storage device becomes equal to or greater than a third threshold.

5. The vehicle according to claim 2, wherein:
the wireless communication device is configured to transmit a state of the vehicle to the management device as needed; and
the control device is configured to start a charge of the first energy storage device using power supplied from the external power supply when the cumulative number of communications of the wireless communication device reaches a predetermined value that is smaller than the first upper limit with no charge of the first energy storage device being performed with the vehicle being electrically connected to the external power supply.

6. The vehicle according to claim 1, wherein the control device is configured to charge the first energy storage device according to a charge command received from the management device with the external power supply and the first energy storage device being electrically connected together.

7. The vehicle according to claim 6, wherein:
the control device is configured to distinguish between first power supply equipment with a function to communicate with the management device and second power supply equipment without a function to communicate with the management device;
the control device is configured to communicate with the management device through the first power supply equipment when the control device charges the first energy storage device according to the charge command using power supplied from the external power supply to the vehicle via the first power supply equipment; and
the control device is configured to communicate with the management device through the wireless communication device when the control device charges the first energy storage device according to the charge command using power supplied from the external power supply to the vehicle via the second power supply equipment.

8. A communication control method for a vehicle, the vehicle including a first energy storage device that is electrically connectable to an external power supply, a wireless communication device, a second energy storage device that supplies power to the wireless communication device, and a control device that communicates with a management device outside the vehicle via the wireless communication device, the method comprising:
receiving, by the control device, a control command for power balancing of the external power supply from the management device via the wireless communication device;
prohibiting, by the control device, wireless communication of the wireless communication device when a cumulative number of communications of the wireless communication device reaches a first upper limit value with the external power supply and the vehicle not being electrically connected to each other; and
prohibiting, by the control device, wireless communication of the wireless communication device when the cumulative number of communications of the wireless communication device reaches a second upper limit value that is greater than the first upper limit value with the external power supply and the vehicle being electrically connected to each other.

* * * * *